US010460217B2

(12) United States Patent
Sagimori et al.

(10) Patent No.: US 10,460,217 B2
(45) Date of Patent: Oct. 29, 2019

(54) INFORMATION PROCESSING DEVICE, INFORMATION PROCESSING METHOD, AND COMPUTER-READABLE RECORDING MEDIUM

(71) Applicants: Yuuki Sagimori, Kanagawa (JP); Akiho Watanabe, Kanagawa (JP)

(72) Inventors: Yuuki Sagimori, Kanagawa (JP); Akiho Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 15/921,697

(22) Filed: Mar. 15, 2018

(65) Prior Publication Data

US 2018/0268269 A1 Sep. 20, 2018

(30) Foreign Application Priority Data

Mar. 16, 2017 (JP) .................................. 2017-051236
Jan. 18, 2018 (JP) .................................. 2018-006753

(51) Int. Cl.
  *G06K 15/02* (2006.01)
  *G03G 15/01* (2006.01)
  *G03G 15/00* (2006.01)

(52) U.S. Cl.
  CPC ........... *G06K 15/027* (2013.01); *G03G 15/01* (2013.01); *G03G 15/5054* (2013.01);
  (Continued)

(58) Field of Classification Search
  CPC ............. G06K 15/027; G06K 15/1878; G06K 15/1881; G06K 2215/0094; G03G 15/01;
  (Continued)

(56) References Cited

U.S. PATENT DOCUMENTS

2011/0058196 A1* 3/2011 Teraue ................. H04N 1/6033
  358/1.9
2011/0216335 A1* 9/2011 Horita ..................... H04N 1/60
  358/1.9

(Continued)

FOREIGN PATENT DOCUMENTS

JP  2008-015197  1/2008
JP  2009-031511  2/2009

(Continued)

*Primary Examiner* — Iriana Cruz
(74) *Attorney, Agent, or Firm* — Oblon, McClelland, Maier & Neustadt, L.L.P.

(57) ABSTRACT

A specification part of an information processing device specifies, by using image data for a correction chart defining a plurality of patch regions having different color values, a target characteristic indicating a relation between the color value and a first colorimetric value of a first patch image as a laminated image of a special color image and a colored image that correspond to each of the patch regions formed by the device through the 2-path printing. A generation part of the device generates a correction table for correcting the color value so that a measured characteristic comes close to the target characteristic, the measured characteristic indicating a relation between the color value and a second colorimetric value of a second patch image as the laminated image corresponding to each of the patch regions formed by the device through the 1-path printing using the image data for a correction chart.

19 Claims, 29 Drawing Sheets

(52) U.S. Cl.
CPC ..... *G03G 15/5062* (2013.01); *G03G 15/6585* (2013.01); *G06K 15/1878* (2013.01); *G06K 15/1881* (2013.01); *G03G 2215/00063* (2013.01); *G06K 2215/0094* (2013.01)

(58) Field of Classification Search
CPC ........... G03G 15/5054; G03G 15/5062; G03G 15/6585; G03G 2215/00063
See application file for complete search history.

(56) References Cited

U.S. PATENT DOCUMENTS

2016/0080607 A1* 3/2016 Horita ................. H04N 1/6033
                                                                                         358/1.9
2017/0153573 A1* 6/2017 Kawasaki .......... G03G 15/0121

FOREIGN PATENT DOCUMENTS

| | | |
|---|---|---|
| JP | 2015-206951 | 11/2015 |
| JP | 2016-063287 | 4/2016 |
| JP | 2016-129990 | 7/2016 |

* cited by examiner

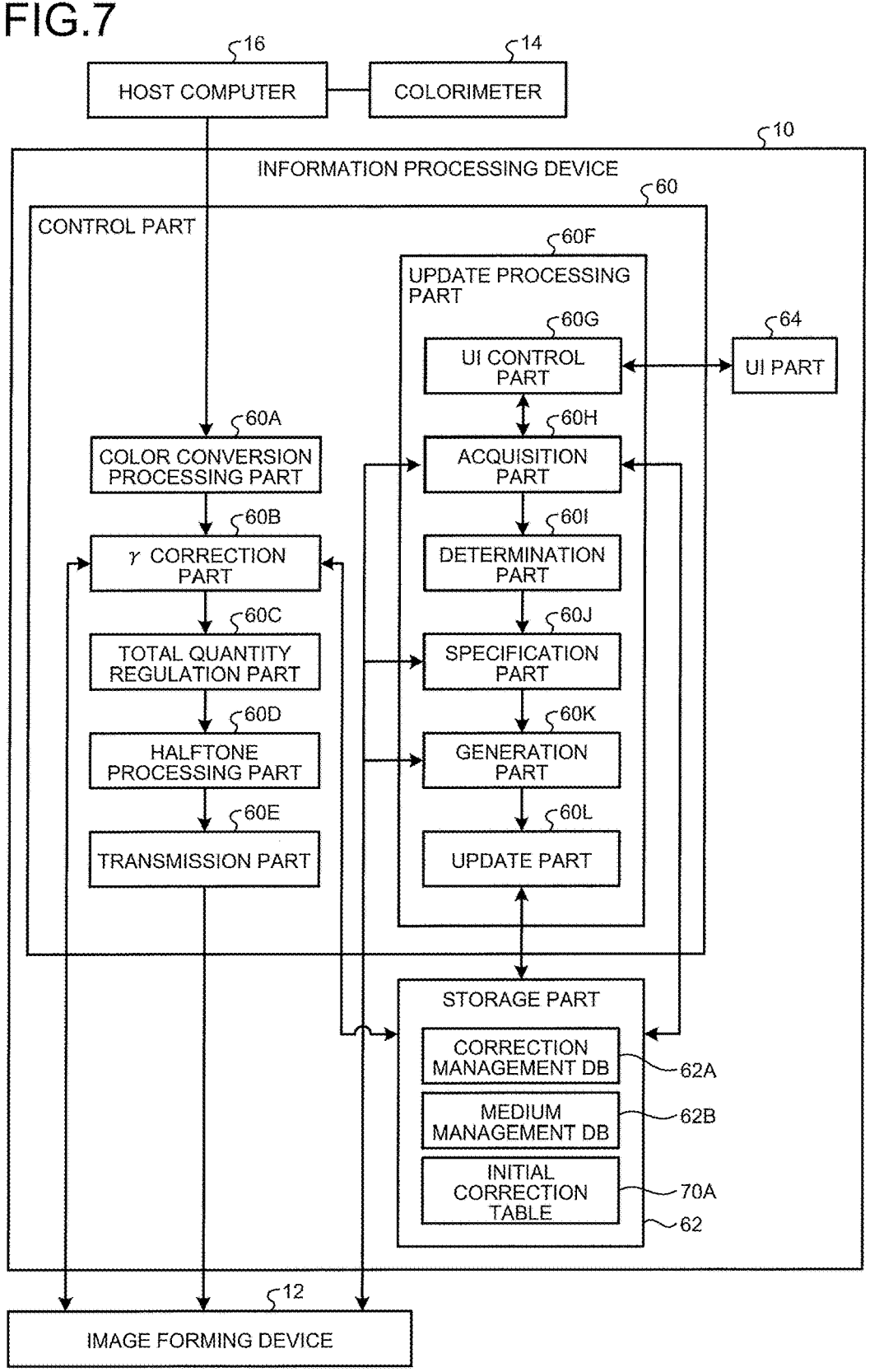

FIG.8

CORRECTION MANAGEMENT DB　62A

| CALIBRATION ID | CALIBRATION CONDITION ||||| TARGET CHARACTERISTIC | CORRECTION TABLE |
| --- | --- | --- | --- | --- | --- | --- | --- |
| | MEDIUM ID | LAMINATING ORDER INFORMATION | SPECIAL COLOR TYPE INFORMATION | WHETHER TO USE SPECIAL COLOR FOR CALIBRATION | IMAGE DATA FOR CORRECTION CHART || | |
| | | | | | IMAGE DATA FOR COLORED CORRECTION CHART | IMAGE DATA FOR SPECIAL COLOR CORRECTION CHART | | |
| 01 | A | MEDIUM, SPECIAL COLOR IMAGE, COLORED IMAGE | WHITE | USE | A1 | B1 | C1 | D1 |
| 02 | B | MEDIUM, SPECIAL COLOR IMAGE, COLORED IMAGE | GOLD | USE | A1 | B2 | C2 | D2 |
| 03 | C | MEDIUM, COLORED IMAGE, SPECIAL COLOR IMAGE | TRANSPARENT | USE | A1 | B3 | C3 | D3 |
| 04 | A | MEDIUM, SPECIAL COLOR IMAGE, COLORED IMAGE | WHITE | NOT USE | A1 | - | - | D4 |
| ⋮ | | | | | | | | |

FIG.9A   FIG.9B
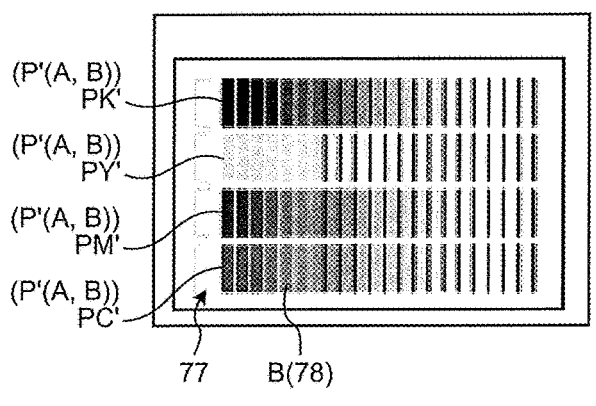
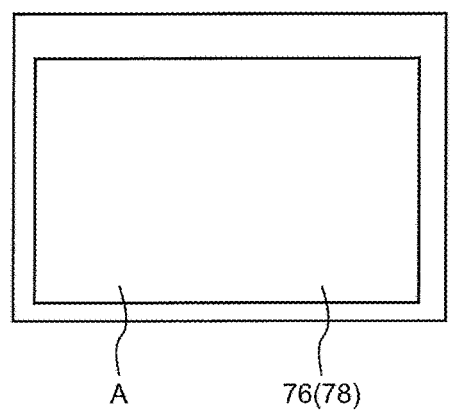
FIG.10
MEDIUM MANAGEMENT DB                                             62B
| MEDIUM ID | MEDIUM INFORMATION | | | | |
| --- | --- | --- | --- | --- | --- |
| | MEDIUM NAME | SIZE (WIDTH AND HEIGHT) | WEIGHTING | COLOR | TYPE |
| A | paperA | XXX, YYY | JJJJ | BLACK | PLAIN PAPER |
| B | paperB | XXX, YYY | JJJJ | WHITE | PLAIN PAPER |
| C | paperC | XXX, YYY | JJJJ | WHITE | PLAIN PAPER |

FIRST PATH

52(76, 78)  40

SECOND PATH (P1, 50)P1K
(P1, 50)P1Y
(P1, 50)P1M
(P1, 50)P1C 40  52(76, 78)  54(77, 78, 50)

1-PATH (P2, 50)P2K
(P2, 50)P2Y
(P2, 50)P2M
(P2, 50)P2C 40  52(76)  54(77, 50)

| PATCH REGION | | | | COLOR VALUE |
|---|---|---|---|---|
| C00 | M00 | Y00 | K00 | 0 |
| C01 | M01 | Y01 | K01 | 16 |
| C02 | M02 | Y02 | K02 | 32 |
| C03 | M03 | Y03 | K03 | 48 |
| C04 | M04 | Y04 | K04 | 64 |
| C05 | M05 | Y05 | K05 | 80 |
| C06 | M06 | Y06 | K06 | 96 |
| C07 | M07 | Y07 | K07 | 112 |
| C08 | M08 | Y08 | K08 | 128 |
| C09 | M09 | Y09 | K09 | 143 |
| C10 | M10 | Y10 | K10 | 159 |
| C11 | M11 | Y11 | K11 | 175 |
| C12 | M12 | Y12 | K12 | 191 |
| C13 | M13 | Y13 | K13 | 207 |
| C14 | M14 | Y14 | K14 | 223 |
| C15 | M15 | Y15 | K15 | 239 |
| C16 | M16 | Y16 | K16 | 255 |

FIG.19

| COLOR VALUE | FIRST COLORIMETRIC VALUE | | | |
|---|---|---|---|---|
| | C | M | Y | K |
| 0 | 0.04 | 0.05 | 0.03 | 0.06 |
| 16 | 0.07 | 0.06 | 0.04 | 0.07 |
| 32 | 0.09 | 0.07 | 0.05 | 0.10 |
| 48 | 0.12 | 0.10 | 0.06 | 0.14 |
| 64 | 0.16 | 0.14 | 0.08 | 0.20 |
| 80 | 0.20 | 0.18 | 0.11 | 0.26 |
| 96 | 0.25 | 0.22 | 0.14 | 0.34 |
| 112 | 0.32 | 0.27 | 0.17 | 0.42 |
| 128 | 0.39 | 0.33 | 0.20 | 0.51 |
| 143 | 0.47 | 0.40 | 0.24 | 0.60 |
| 159 | 0.57 | 0.50 | 0.30 | 0.72 |
| 175 | 0.67 | 0.60 | 0.36 | 0.84 |
| 191 | 0.80 | 0.71 | 0.45 | 0.96 |
| 207 | 0.93 | 0.83 | 0.55 | 1.10 |
| 223 | 1.07 | 0.97 | 0.69 | 1.24 |
| 239 | 1.25 | 1.12 | 0.84 | 1.40 |
| 255 | 1.45 | 1.30 | 1.00 | 1.60 |

| COLOR VALUE | K-COLOR COLORIMETRIC VALUE | |
|---|---|---|
| | FIRST COLORIMETRIC VALUE | SECOND COLORIMETRIC VALUE |
| 0 | 0.06 | 0.06 |
| 16 | 0.07 | 0.07 |
| 32 | 0.10 | 0.08 |
| 48 | 0.14 | 0.09 |
| 64 | 0.20 | 0.12 |
| 80 | 0.26 | 0.16 |
| 96 | 0.34 | 0.20 |
| 112 | 0.42 | 0.25 |
| 128 | 0.51 | 0.30 |
| 143 | 0.60 | 0.37 |
| 159 | 0.72 | 0.42 |
| 175 | 0.84 | 0.50 |
| 191 | 0.96 | 0.60 |
| 207 | 1.10 | 0.72 |
| 223 | 1.24 | 0.85 |
| 239 | 1.40 | 1.00 |
| 255 | 1.60 | 1.20 |

FIG.24

| CORRECTION TABLE 70B | | COLORIMETRIC VALUE AFTER γ CORRECTION 75 |
|---|---|---|
| INPUT COLOR VALUE | OUTPUT COLOR VALUE | |
| 0 | 0 | 0.06 |
| 16 | 16 | 0.07 |
| 32 | 53 | 0.10 |
| 48 | 72 | 0.14 |
| 64 | 96 | 0.20 |
| 80 | 115 | 0.26 |
| 96 | 137 | 0.34 |
| 112 | 159 | 0.42 |
| 128 | 177 | 0.51 |
| 143 | 191 | 0.60 |
| 159 | 207 | 0.72 |
| 175 | 222 | 0.84 |
| 191 | 237 | 0.96 |
| 207 | 247 | 1.10 |
| 223 | 255 | 1.20 |
| 239 | 255 | 1.20 |
| 255 | 255 | 1.20 |

| INPUT COLOR VALUE | OUTPUT COLOR VALUE BEFORE RECTIFICATION (70B) | OUTPUT COLOR VALUE AFTER RECTIFICATION (70C) | THIRD COLORIMETRIC VALUE |
|---|---|---|---|
| 0 | 0 | 0 | 0.06 |
| 16 | 16 | 16 | 0.07 |
| 32 | 53 | 53 | 0.10 |
| 48 | 72 | 72 | 0.14 |
| 64 | 96 | 96 | 0.20 |
| 80 | 115 | 115 | 0.26 |
| 96 | 137 | 137 | 0.34 |
| 112 | 159 | 159 | 0.42 |
| 128 | 177 | 177 | 0.51 |
| 143 | 191 | 191 | 0.60 |
| 159 | 207 | 207 | 0.72 |
| 175 | 222 | 222 | 0.84 |
| 191 | 237 | 237 | 0.96 |
| 207 | 247 | 241 | 1.02 |
| 223 | 255 | 245 | 1.08 |
| 239 | 255 | 250 | 1.14 |
| 255 | 255 | 255 | 1.20 |

S1   S2   V2

FIG.30
| COLOR | C | M | Y | K |
|---|---|---|---|---|
| RECTIFICATION COLOR VALUE | 207 | 207 | 223 | 159 |
FIG.31A
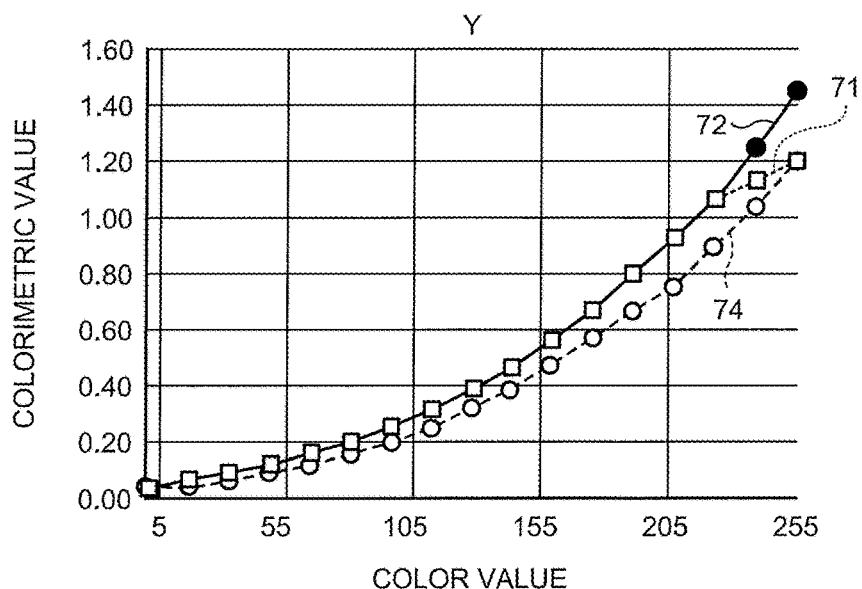
FIG.31B
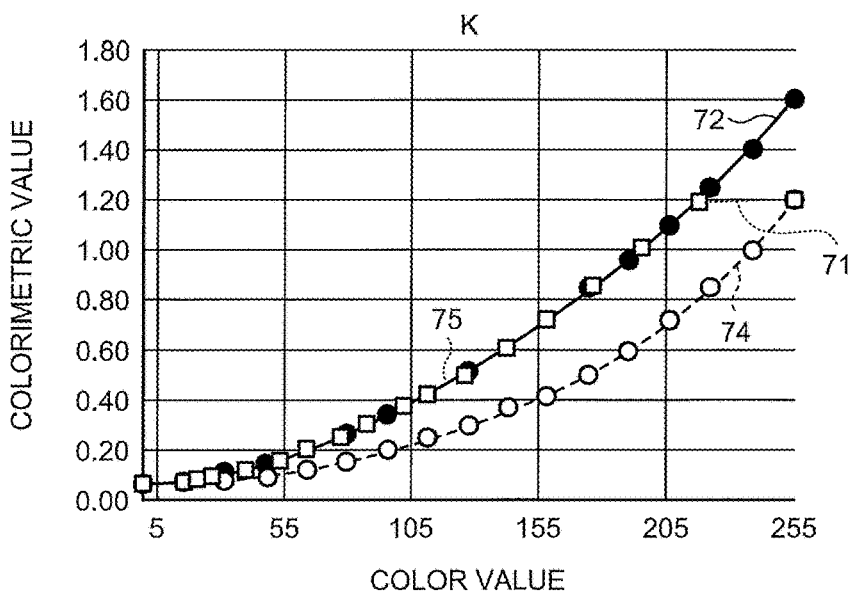

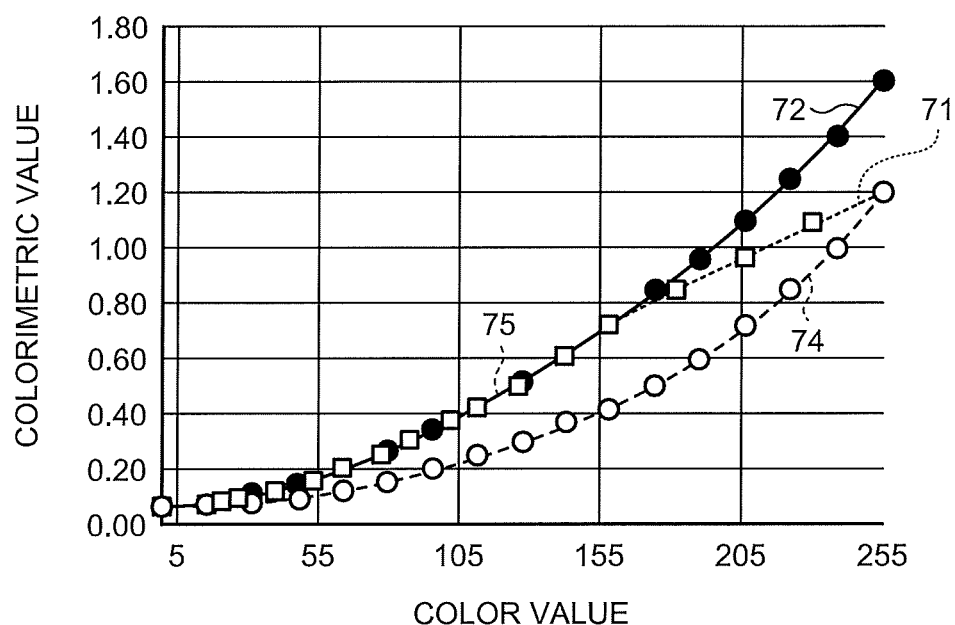

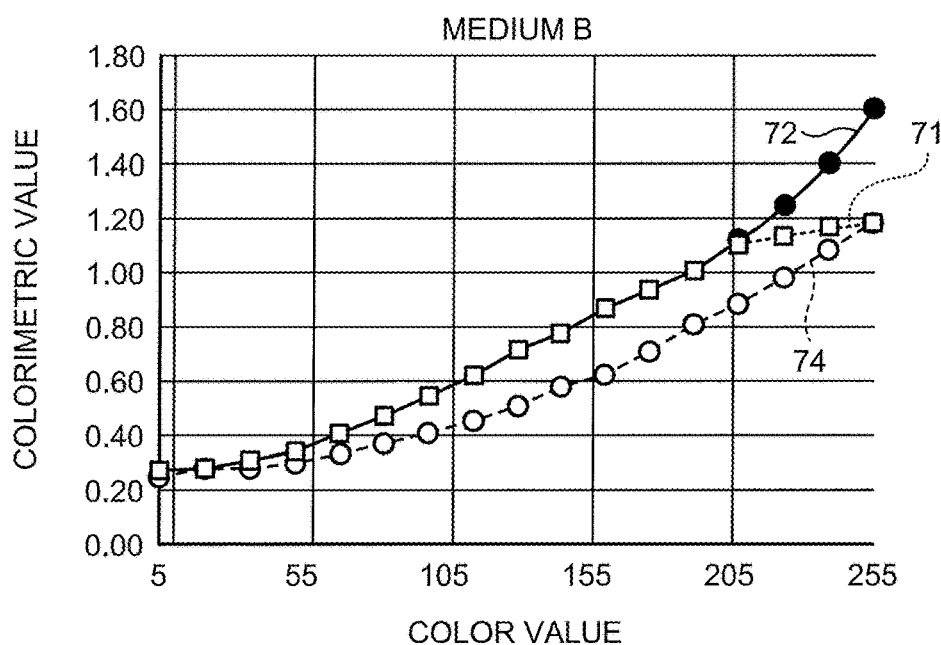

INFORMATION PROCESSING DEVICE, INFORMATION PROCESSING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2017-051236, filed on Mar. 16, 2017 and Japanese Patent Application No. 2018-006753, filed on Jan. 18, 2018. The contents of which are incorporated herein by reference in their entirety.

BACKGROUND OF THE INVENTION

1. Field of the Invention

The present invention relates to an information processing device, an information processing method, and a computer-readable recording medium having an information processing program.

2. Description of the Related Art

There is known a device that forms a laminated image obtained by laminating a colored image using a colored color material such as CMYK and a special color image using a special color material. An image formation method for forming the laminated image of the colored image and the special color image includes 2-path printing in which a special color image is formed to be fixed onto a medium and a colored image is formed being overlapped therewith to be fixed, and 1-path printing in which a special color image and a colored image are formed being overlapped with each other to be fixed onto a medium (for example, refer to Japanese Unexamined Patent Application Publication No. 2009-031511).

Japanese Unexamined Patent Application Publication No. 2009-031511 discloses a configuration enabling the 1-path printing irrespective of a laminating order of the special color image and the colored image by enabling switching whether to develop colorless transparent toner or white toner before colored toner or to develop it lastly.

By forming a laminated image through the 1-path printing, ease of use for a user can be improved. However, in a case of employing the 1-path printing, the special color material and the colored color material are mixed, and image quality is deteriorated in some cases as compared with a case of forming the same laminated image through the 2-path printing.

SUMMARY OF THE INVENTION

According to an embodiment, there is provided an information processing device configured to control an image forming part that forms a laminated image of a special color image using a special color material and a colored image using a colored color material through 2-path printing in which one of the special color image and the colored image is formed on a medium to be immobilized and the other one is laminated thereon, or 1-path printing in which one of the special color image and the colored image is formed on a medium and the other one is laminated thereon without performing immobilization. The information processing device includes a specification part and a generation part. The specification part specifies, by using image data for a correction chart defining a plurality of patch regions having different color values, a target characteristic indicating a relation between the color value and a first colorimetric value of a first patch image as the laminated image corresponding to each of the patch regions formed by the image forming part through the 2-path printing. The generation part generates a correction table for correcting the color value so that a measured characteristic comes close to the target characteristic, the measured characteristic indicating a relation between the color value and a second colorimetric value of a second patch image as the laminated image corresponding to each of the patch regions formed by the image forming part through the 1-path printing using the image data for a correction chart.

BRIEF DESCRIPTION OF THE DRAWINGS

FIG. 7 is a block diagram illustrating a functional configuration of the information processing device;

FIG. 8 is a schematic diagram illustrating an example of a data configuration of a correction management DB;

FIGS. 9A and 9B are schematic diagrams illustrating an example of image data for a correction chart;

FIG. 10 is a schematic diagram illustrating an example of a data configuration of a medium management DB;

FIG. 18 is a schematic diagram illustrating an example of image data for a colored correction chart;

FIG. 19 is a diagram illustrating an example of the target characteristic;

FIG. 20 is an example of a diagram representing the target characteristic and the measured characteristic in a table;

FIG. 24 is a diagram illustrating an example of a relation between the correction table and a colorimetric value after γ correction;

FIG. 27 is a chart illustrating an example of a relation among the correction table before rectification, the correction table after rectification, and a third colorimetric value;

FIG. 30 is a schematic diagram illustrating an example of a data configuration of a color management table;

FIGS. 31A and 31B are schematic diagrams illustrating an example of the rectification characteristic;

FIG. 32 is an explanatory diagram of an example of the rectification characteristic;

FIG. 33 is a schematic diagram illustrating an example of a data configuration of a medium management table;

FIG. 35 is an explanatory diagram of an example of the rectification characteristic;

FIG. 36 is a schematic diagram illustrating an example of a data configuration of a transfer order management table;

FIG. 37 is a diagram illustrating an example of a rectification color value;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
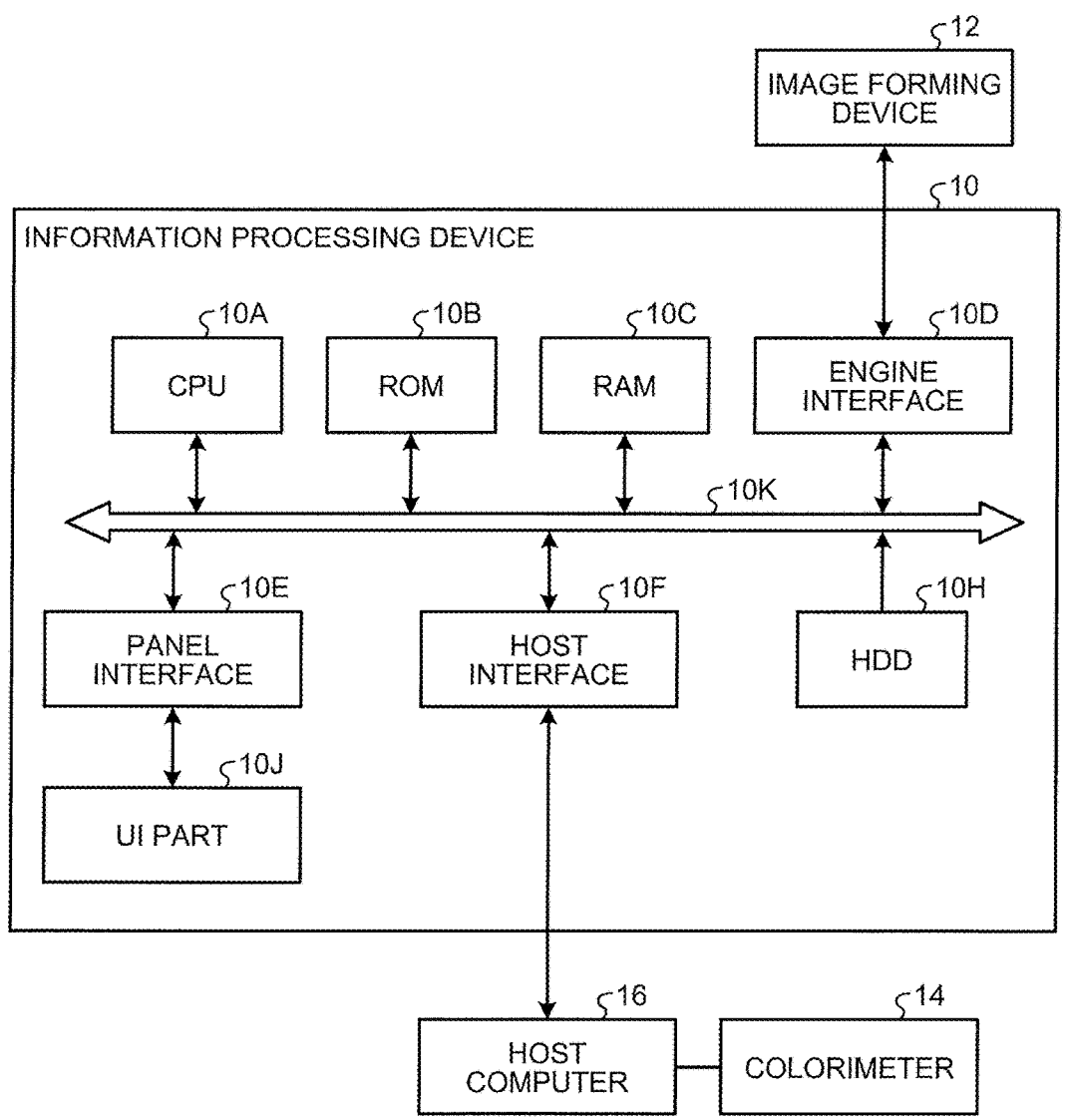
FIG. 1 illustrates an example of a hardware configuration of an information processing device according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The following describes embodiments of an information processing device, an information processing method, and a computer-readable recording medium having an information processing program in detail with reference to the attached drawings.

First Embodiment

FIG. 1 illustrates an example of a hardware configuration of an information processing device 10 according to the present embodiment.

The information processing device 10 is a device that performs information processing according to the present embodiment. A host computer 16 is connected to the information processing device 10. The host computer 16 is a personal computer (PC) and the like. The information processing device 10 receives image data from the host computer 16. The information processing device 10 performs information processing on the image data and outputs it to an image forming device 12.

Figure 2:
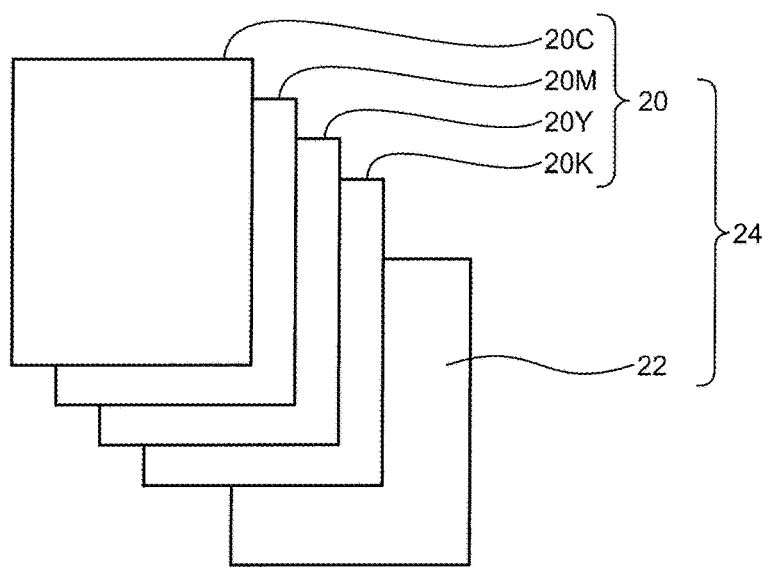
FIG. 2 is a schematic diagram conceptually illustrating image data.

FIG. 2 is a schematic diagram conceptually illustrating image data 24. The image data 24 includes colored image data 20 and special color image data 22. The image data 24 may further include a job command and the like indicating an image formation condition of the image forming device 12.

The colored image data 20 is image data defining a color concentration value of RGB, CMYK, and the like. In the present embodiment, the colored image data 20 includes a plurality of types of pieces of color image data having different colors. In the present embodiment, the colored image data 20 is described by exemplifying a case of including each piece of the color image data of yellow, magenta, cyan, and black (color image data 20Y, 20M, 20C, and 20K).

In the present embodiment, described is a case in which the colored image data 20 is image data defining the colored concentration value for each pixel. Thus, in the present embodiment, each piece of the color image data (color image data 20Y, 20M, 20C, and 20K) constituting the colored image data 20 is image data defining the concentration value of each corresponding color (C, M, Y, and K) for each pixel. In the present embodiment, described is a case in which the colored image data 20 is data representing the concentration value of one pixel in 8 bits as an example.

The information processing device 10 may receive the image data 24 including color image data of R, G, and B from the host computer 16. In this case, the information processing device 10 converts the color image data of R, G, and B into color image data of C, M, Y, and K (20Y, 20M, 20C, and 20K).

The special color image data 22 is image data defining a concentration value of a special color for each pixel. The special color is a color other than basic colors such as CMYK and RGB. Examples of the special color include a metal color with metal, white, a transparent color, and a fluorescent color. The metal color is a color reproducing metallic luster. Examples of the metal color include gold and silver. The metal color may be a color obtained by adding a color tone such as CMYK and RGB to a basic metal color such as gold and silver. The fluorescent color may be a color representing a color tone such as CMYK as a fluorescent color. The special color material may include a component that absorbs or reflects light in a specific wavelength region such as ultraviolet rays.

In the present embodiment, exemplified is a case in which the special color image data 22 is data representing the concentration value of one pixel in 8 bits.

Returning to FIG. 1, the description will be continued. The information processing device 10 performs information processing on the image data 24 received from the host computer 16. Through this information processing, the information processing device 10 performs various pieces of processing such as correction on the image data received from the host computer 16, and converts the image data into a format that can be processed by the image forming device 12. The information processing device 10 then outputs, to the image forming device 12, the image data on which processing such as conversion or correction is performed.

That is, the information processing device 10 transmits, to the image forming device 12, the image data that can be processed by the image forming device 12 to control the image forming device 12.

The information processing device 10 includes a central processing unit (CPU) 10A, a ROM 10B, a RAM 10C, an engine interface 10D, a panel interface 10E, a user interface (UI) part 10J, a host interface 10F, and a hard disk drive (HDD) 10H. The CPU 10A, the ROM 10B, the RAM 10C, the engine interface 10D, the panel interface 10E, the host interface 10F, and the HDD 10H are connected to each other via a bus 10K so as to exchange data with each other.

The panel interface 10E is a connection interface of the UI part 10J. The UI part 10J has an input function for receiving an operation instruction from a user, and a display function for displaying various images. The UI part 10J may separately include the input function and the display function.

Examples of the input function include a touch panel. Examples of the input function include a keyboard and a mouse. Examples of the display function include a liquid crystal display device and a display device using organic EL.

The host interface 10F is a connection interface of the host computer 16. The engine interface 10D is a connection interface of the image forming device 12.

Next, the following describes a colorimeter 14. The colorimeter 14 is a device that measures a color of an image formed on a medium. As the colorimeter 14, a known colorimeter may be used. For example, the colorimeter 14 irradiates a measured object with light, and receives reflected light to measure a color. The colorimeter 14 may be an automatic scanning type or a manual scanning type. In the present embodiment, the colorimeter 14 measures a color of each patch image formed on the medium (details will be described later).

For example, the colorimeter 14 is connected to the host computer 16. Specifically, the colorimeter 14 is connected to the host computer 16 via a universal serial bus (USB) cable. A connection form between the colorimeter 14 and the host computer 16 is not limited to connection using the USB cable. The colorimeter 14 may be connected to the information processing device 10. The present embodiment describes a form in which the colorimeter 14 is connected to the host computer 16 as an example.

Next, the following describes the image forming device 12. The image forming device 12 is an example of an image forming part. The image forming device 12 forms an image on the medium using the image data generated by the information processing device 10.

The medium may be a medium on which an image can be formed. Examples of the medium include a known paper medium (sheet), synthetic paper, and plastic paper.

The image forming device 12 is a device that can form a laminated image of a special color image using a special color material and a colored image using a colored color material. The image forming device 12 is, for example, an image forming device of an electrophotographic type or an ink jet type.

The present embodiment describes a case in which the image forming device 12 is an image forming device of electrophotographic type as an example. The present embodiment also describes a case in which colored toner of CMYK and special color toner are loaded on the image forming device 12 as the colored color material and the special color material. The special color toner is toner used for realizing a special color. Examples of the special color toner include metal toner, transparent (colorless) toner, white toner, and fluorescent toner. The image forming device 12 may be a device that forms an image using colored ink of CMYK and special color ink of a special color as the colored color material and the special color material.

Figure 3:
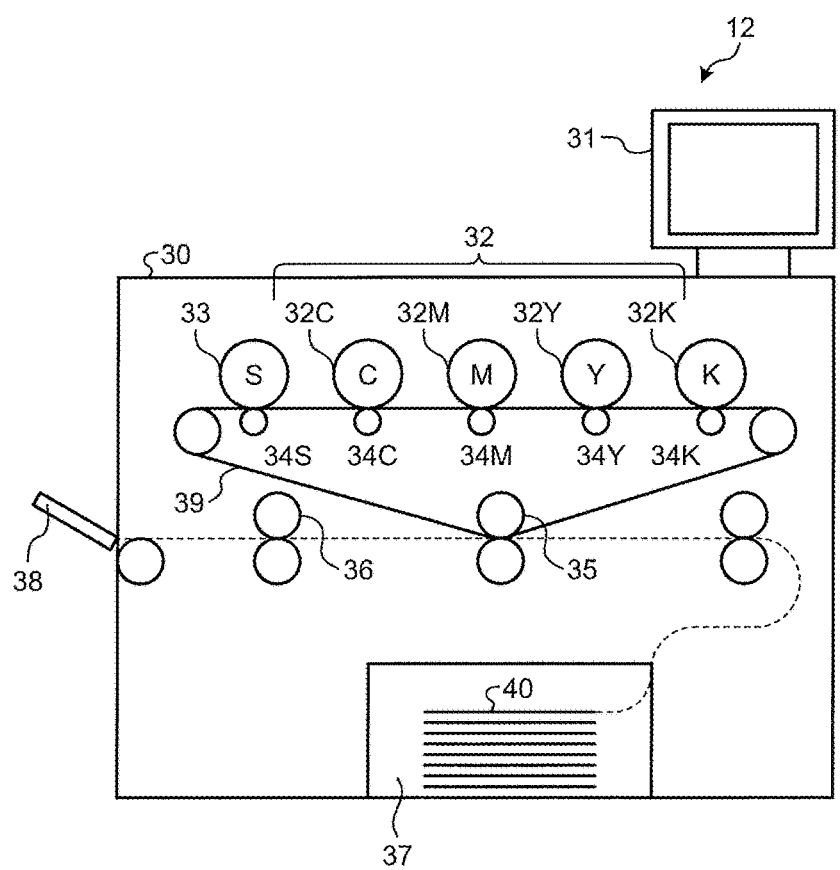
FIG. 3 is a schematic diagram illustrating an example of a configuration of an image forming device according to the embodiment.

FIG. 3 is a schematic diagram illustrating an example of a configuration of the image forming device 12 according to the present embodiment. The image forming device 12 includes a panel operation part 31 and a main body part 30. The panel operation part 31 receives various operations from the user, and displays various images. The main body part 30 includes a mechanism used for image formation arranged therein.

Specifically, the main body part 30 includes a colored image forming unit 32 and a special color image forming unit 33.

The colored image forming unit 32 includes colored image forming units 32C, 32M, 32Y, and 32K. Each of the colored image forming units 32C, 32M, 32Y, and 32K includes an image bearer on which a colored toner image is formed with the colored toner of CMYK. The colored toner image formed on the image bearer of the colored image forming unit 32 is primarily transferred onto an intermediate transfer belt 39 by each of primary transfer units 34C, 34M, 34Y, and 34K.

The special color image forming unit 33 includes an image bearer on which a special color toner image is formed with the special color toner. The special color toner image formed on the image bearer of the special color image forming unit 33 is primarily transferred onto the intermediate transfer belt 39 by a primary transfer unit 34S. A medium 40 accumulated in a sheet feeding tray 37 is conveyed to a secondary transfer unit 35 one by one.

The special color toner image and the colored toner image that are primarily transferred onto the intermediate transfer belt 39 are secondarily transferred onto the medium 40 by the secondary transfer unit 35, and fixed by a fixing unit 36. That is, the colored image and the special color image are fixed onto the medium 40 by the fixing unit 36. Fixing is an example of immobilization.

In a case of using the special color ink and the colored ink as the special color material and the colored color material, the fixing unit 36 may dry ink (the special color ink, the colored ink) given to the secondary transfer unit 35 to be fixed to the medium 40. That is, drying is also an example of immobilization.

The medium 40 on which the laminated image of the special color image and the colored image is formed is ejected to an ejection tray 38.

In the image forming device 12 according to the present embodiment, the positions of the colored image forming unit 32 and the special color image forming unit 33 may be replaced with each other.

Figure 4A:
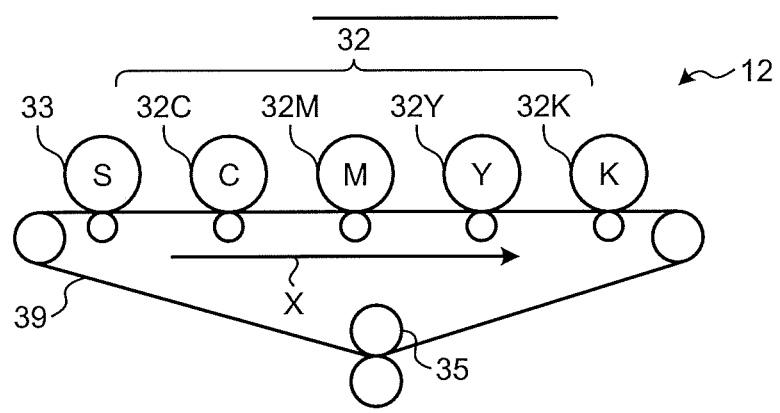
FIGS. 4A and 4B are explanatory diagrams of the image forming device.
Figure 4B:
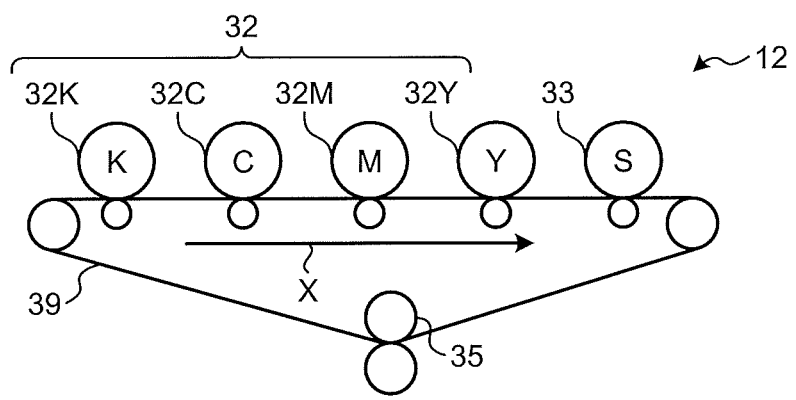

FIGS. 4A and 4B are explanatory diagrams of the image forming device 12. In the image forming device 12 according to the present embodiment, the special color image forming unit 33 may be arranged on an upstream side of a moving direction X of the intermediate transfer belt 39 with respect to the colored image forming unit 32 (refer to FIG. 4A). In the image forming device 12, the special color image forming unit 33 may be arranged on a downstream side of the moving direction X of the intermediate transfer belt 39 with respect to the colored image forming unit 32 (refer to FIG. 4B).

The arrangement positions of the colored image forming unit 32 and the special color image forming unit 33 can be changed, for example, through position exchanging work by the user. The arrangement positions of the colored image forming unit 32 and the special color image forming unit 33 may be caused to be replaceable by a driving mechanism by providing the driving mechanism for replacing the positions.

That is, the image forming device 12 according to the present embodiment has a configuration in which the laminating order of the colored image and the special color image with respect to the medium 40 is variable.

Figure 5A:
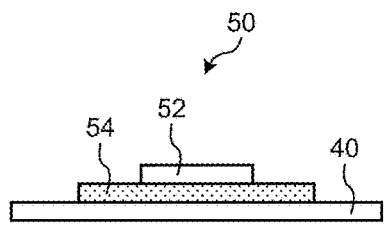
FIGS. 5A and 5B are explanatory diagrams of an example of a laminating order.
Figure 5B:
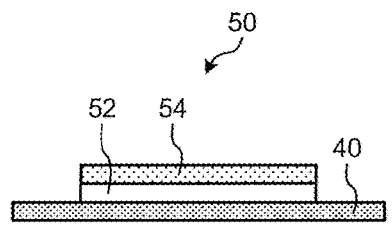

FIGS. 5A and 5B are explanatory diagrams of an example of the laminating order. For example, the colored image forming unit 32 and the special color image forming unit 33 are arranged so that a laminated image 50 obtained by laminating a colored image 54 and a special color image 52 in this order can be formed on the medium 40. In this case, as illustrated in FIG. 5A, the laminated image 50 formed by the image forming device 12 becomes an image obtained by laminating the colored image 54 and the special color image 52 in this order on the medium 40.

The colored image forming unit 32 and the special color image forming unit 33 are arranged so that the laminated image 50 obtained by laminating the special color image 52 and the colored image 54 in this order can be formed on the medium 40. In this case, as illustrated in FIG. 5B, the laminated image 50 formed by the image forming device 12 becomes the laminated image 50 obtained by laminating the special color image 52 and the colored image 54 in this order on the medium 40.

Figure 6A:
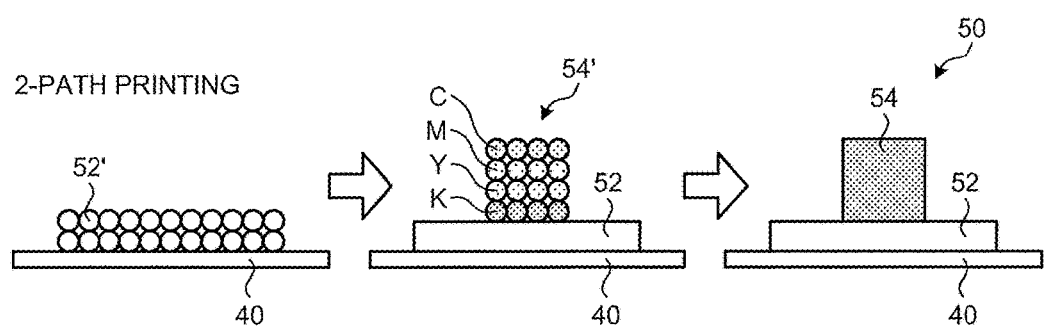
FIGS. 6A and 6B are explanatory diagrams of 1-path printing and 2-path printing.
Figure 6B:
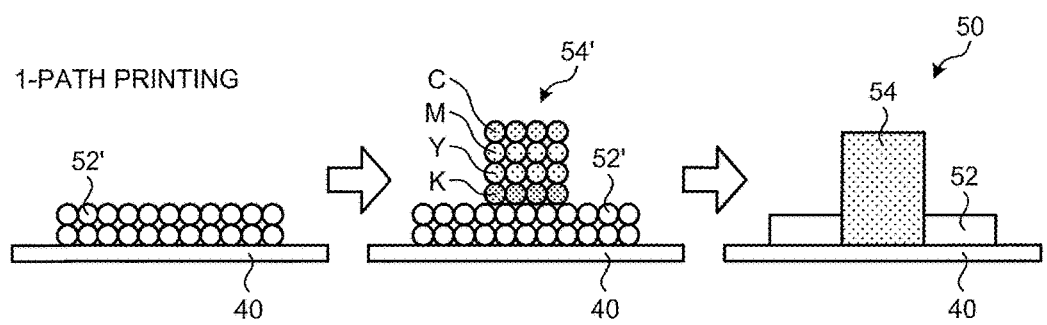

A method of forming the laminated image 50 by the image forming device 12 includes 1-path printing and 2-path printing. FIGS. 6A and 6B are explanatory diagrams of the 1-path printing and the 2-path printing.

FIG. 6A is an explanatory diagram of the 2-path printing. The 2-path printing is a printing method of forming one of the special color image 52 and the colored image 54 on the medium 40 to be immobilized, and laminating the other one thereof thereon.

Immobilization means to immobilize the color material on the medium 40. Specifically, in a case in which the color material is toner (special color toner, colored toner), immobilization means fixation. In a case in which the color material is ink (special color ink, colored ink), immobilization means drying.

For example, in the 2-path printing, as illustrated in FIG. 6A, special color toner 52' is applied and fixed onto the medium 40 to be the special color image 52, and colored toner 54' is further applied and fixed onto the special color image 52 to form the laminated image 50 obtained by laminating the colored image 54 on the special color image 52.

FIG. 6B is an explanatory diagram of the 1-path printing. The 1-path printing is a printing method of forming one of the special color image 52 and the colored image 54 on the medium 40, and laminating the other one thereof thereon without performing immobilization.

For example, in the 1-path printing, as illustrated in FIG. 6B, the special color toner 52' is applied onto the medium 40, and the colored toner 54' is laminated on the special color toner 52' without performing fixation, and they are fixed lastly. Accordingly, the laminated image 50 obtained by laminating the special color image 52 and the colored image 54 is formed on the medium 40.

In a case of forming the laminated image 50 through the 2-path printing by using the image forming device 12, a toner image (a colored toner image or a special color toner image) is formed on the medium 40 by one of the colored image forming unit 32 and the special color image forming unit 33, and the toner image is fixed by the fixing unit 36. The medium 40 is then set to the image forming device 12 again. The toner image (the colored toner image or the special color toner image) is formed on the medium 40 by the other one of the units (the other one of the colored image forming unit 32 and the special color image forming unit 33), and the toner image is fixed by the fixing unit 36. Thus, operability for the user is poor in a case of 2-path printing, and creases and the like may be generated on the medium 40 when the medium 40 is repeatedly conveyed, for example.

However, in a case of forming the laminated image 50 through the 2-path printing, as illustrated in FIG. 6A, the colored color material and the special color material are prevented from being mixed with each other, and good image quality is achieved as compared with the laminated image 50 formed through the 1-path printing (refer to FIG. 6B).

On the other hand, in a case of forming the laminated image 50 through the 1-path printing, fixation (immobilization) is not performed between formation of the colored image and formation of the special color image, so that the operability is improved and time for image formation is shortened, for example. However, in a case of 1-path printing, as illustrated in FIG. 6B, the colored color material and the special color material are mixed with each other, and the image quality may be deteriorated as compared with the case of 2-path printing.

The information processing device 10 according to the present embodiment generates a correction table for correcting a color value of the image data to improve the image quality of the laminated image 50 formed through the 1-path printing (details will be described later). The correction table for correcting the color value is referred to as a γ correction table in some cases.

Next, the following describes a functional configuration of the information processing device 10 according to the present embodiment. FIG. 7 is a block diagram illustrating a functional configuration of the information processing device 10.

The information processing device 10 includes a control part 60, a UI part 64, and a storage part 62. The UI part 64 and the storage part 62 are connected to the control part 60 so as to exchange data and a signal with each other.

The UI part 64 is implemented by the UI part 10J (refer to FIG. 1). The storage part 62 is, for example, implemented by the HDD 10H (refer to FIG. 1). The storage part 62 stores therein various pieces of data. In the present embodiment, the storage part 62 stores therein a correction management DB 62A, a medium management DB 62B, and an initial correction table 70A (details will be described later).

The control part 60 includes a color conversion processing part 60A, a γ correction part 60B, a total quantity regulation part 60C, a halftone processing part 60D, a transmission part 60E, and an update processing part 60F. The update processing part 60F includes a UI control part 60G, an acquisition part 60H, a determination part 60I, a specification part 60J, a generation part 60K, and an update part 60L.

Part or all of the color conversion processing part 60A, the γ correction part 60B, the total quantity regulation part 60C, the halftone processing part 60D, the transmission part 60E, the update processing part 60F, the UI control part 60G, the acquisition part 60H, the determination part 60I, the specification part 60J, the generation part 60K, and the update part 60L are implemented by one or a plurality of processors, for example. For example, the components described above may be implemented by causing a processor such as a CPU to execute a computer program, that is, implemented by software. The components described above may be implemented by a processor such as a dedicated integrated circuit (IC), that is, implemented by hardware. The components described above may be implemented by using both of the software and the hardware. In a case of using a plurality of processors, each processor may implement one of the components, or implement two or more of the components.

The color conversion processing part 60A acquires the image data 24 from the host computer 16. For example, the color conversion processing part 60A acquires the image data 24 in which one pixel is represented by a concentration value in 8 bits. The color conversion processing part 60A then performs color conversion processing on the colored image data 20 included in the acquired image data 24. For example, it is assumed that the colored image data 20 included in the image data 24 acquired from the host computer 16 is an RGB color space. In this case, the color conversion processing part 60A converts the colored image data 20 of the RGB color space into the colored image data 20 of a CMYK color space. Accordingly, the color conversion processing part 60A obtains the colored image data 20 (color image data 20C, 20M, 20Y, and 20K) of each color of CMYK. The color conversion processing part 60A then outputs, to the γ correction part 60B, the colored image data 20 on which color conversion is performed.

The color conversion processing part 60A outputs, to the γ correction part 60B, the special color image data 22 included in the acquired image data 24 as it is without performing image processing.

The γ correction part 60B performs γ correction on the colored image data 20 (color image data 20C, 20M, 20Y, and 20K) of each color of CMYK and the special color image data 22. In the present embodiment, the γ correction part 60B performs γ correction on a color value (a concentration value, a gradation value) of the colored image data 20 using the correction table. At this point in time, the γ correction part 60B reads the correction table corresponding to a calibration condition (described later) from the storage part 62, and performs γ correction using the read correction table (details will be described later).

The γ correction part 60B outputs, to the total quantity regulation part 60C, the special color image data 22 included in the acquired image data 24 as it is without performing γ correction.

The correction table is updated by the update processing part 60F (details will be described later). That is, the γ correction part 60B performs γ correction using the correction table corrected by the update processing part 60F.

The total quantity regulation part 60C performs total quantity regulation processing using the special color image data 22 and the colored image data 20 on which γ correction is performed. There is a limit to a quantity of color materials (quantity of toner) that can be placed in a region corresponding to one pixel on the medium 40 by the image forming device 12. Total quantity regulation is processing of correcting each pixel value (concentration value) of the colored image data 20 and the special color image data 22 so that a total quantity of color materials per region corresponding to one pixel on the medium 40 is equal to or smaller than the limit quantity.

The total quantity regulation part 60C outputs, to the halftone processing part 60D, the colored image data 20 (color image data 20C, 20M, 20Y, and 20K) and the special color image data 22 on which total quantity regulation is performed.

The halftone processing part 60D performs halftone processing. The halftone processing part 60D performs halftone processing on the colored image data 20 (color image data 20C, 20M, 20Y, and 20K) and the special color image data 22 received from the total quantity regulation part 60C.

The halftone processing is processing of causing each pixel value of the colored image data 20 (color image data 20C, 20M, 20Y, and 20K) and the special color image data 22 in which the pixel value of each pixel is represented by a gradation value from 0 to 255 represented in 8 bits to be small (for example, to be binarized). The halftone processing is referred to as screen processing in some cases.

The transmission part 60E outputs, to the image forming device 12, the image data 24 on which halftone processing is performed by the halftone processing part 60D.

The following describes the storage part 62 storing the correction table used by the γ correction part 60B. As described above, the storage part 62 stores therein the correction management DB 62A, the medium management DB 62B, and the initial correction table 70A.

The correction management DB 62A is a database for managing the correction table used at the time when the γ correction part 60B performs γ correction. A data format of the correction management DB 62A is not limited to a database. For example, the data format of the correction management DB 62A may be a table.

FIG. 8 is a schematic diagram illustrating an example of a data configuration of the correction management DB 62A. In the correction management DB 62A, the calibration condition, image data for a correction chart, a target characteristic, and a correction table are associated with each other. The calibration condition, the image data for a correction chart, the target characteristic, and the correction table in the correction management DB 62A are registered and updated by the update processing part 60F described later.

The calibration condition indicates a condition at the time when the γ correction part 60B performs γ correction. The calibration condition registered in the correction management DB 62A is defined in accordance with a current setting of the image forming device 12. In the present embodiment, the calibration condition includes a calibration ID, a medium ID, laminating order information, special color type information, and information indicating whether to use the special color for calibration.

The calibration ID is identification information of the calibration condition. The medium ID is identification information for identifying medium information of the medium 40. The medium information is defined with a plurality of parameters for specifying the medium 40. For example, the medium information is defined with the parameters such as a medium name, a size (width and height), weighting, a color, and a type.

The laminating order information is information indicating the laminating order of the special color image 52 and the colored image 54 with respect to the medium 40. The laminating order information includes laminating order information indicating that the special color image and the colored image are laminated on the medium in this order, and laminating order information indicating that the colored image and the special color image are laminated on the medium in this order.

The special color type information is information indicating a type of the special color material mounted on the image forming device 12. In the present embodiment, the special color type information is information indicating white, gold, transparent (clear), or fluorescence, for example.

Whether to use the special color for calibration indicates "use" indicating that γ correction is performed using the special color, or "not use" indicating that γ correction is performed without using the special color.

Next, the following describes the image data for a correction chart. The image data for a correction chart is data defining a plurality of patch regions having different color values. FIGS. 9A and 9B are schematic diagrams illustrating an example of image data 78 for a correction chart.

FIG. 9A is an example of the image data 78 for a correction chart. The image data 78 for a correction chart is data defining a plurality of patch regions P' having different color values. The patch region P' is a laminated region of a patch region A of special color and a colored region B.

Specifically, the image data 78 for a correction chart includes a plurality of patch regions PK', a plurality of patch regions PY', a plurality of patch regions PM', and a plurality of patch regions PC' as the patch regions P'. Each of the patch regions P' is the laminated region of the patch region A of special color and the colored region B.

The patch region PK' is a region in which the colored region B of K color is laminated on the patch region A of special color. Concentration values of K color in the patch regions PK' are different from each other. The patch region PY' is a region in which the colored region B of Y color is laminated on the patch region A of special color. Concentration values of Y color in the patch regions PY' are different from each other. The patch region PM' is a region in which the colored region B of M color is laminated on the patch region A of special color. Concentration values of M color in the patch regions PM' are different from each other. The patch region PC' is a region in which the colored region B of C color is laminated on the patch region A of special color. Concentration values of C color in the patch regions PC' are different from each other.

Each of the patch regions P' is a laminated region, so that, specifically, the image data 78 for a correction chart is constituted of image data 76 for a special color correction chart and image data 77 for a colored correction chart. As illustrated in FIG. 9B, the image data 76 for a special color correction chart is data defining the special color value of the patch region A of special color with the special color material. In the present embodiment, described is a case in which the patch region A of special color is represented as a region of a solid image (100% concentration).

The storage part 62 previously stores therein the image data 76 for a special color correction chart corresponding to the special color type information for each piece of special color type information. For example, the storage part 62 previously stores therein the image data 76 for a special color correction chart defining the special color value (a white concentration value) of the patch region A of special color of white corresponding to the special color type information "white". The storage part 62 previously stores therein the image data 76 for a special color correction chart defining the special color value (a gold concentration value) of the patch region A of special color of gold corresponding to the special color type information "gold". The storage part 62 previously stores therein the image data 76 for a special color correction chart defining the special color value (a concentration value) of the patch region A of special color of transparency corresponding to the special color type information "transparent". The storage part 62 previously stores therein the image data 76 for a special color correction chart defining the special color value (a fluorescence concentration value) of the patch region A of special color of fluorescence corresponding to the special color type information "fluorescence".

On the other hand, as illustrated in FIG. 9A, the image data 77 for a colored correction chart is data defining a colored color value of the colored region B using the colored color material. The image data 77 for a colored correction chart defines a plurality of colored regions B of K color, Y color, M color, and C color having different concentration values.

Returning to FIG. 8, the description will be continued. In the correction management DB 62A, the image data 78 for a correction chart corresponding to the calibration condition is registered. The image data 78 for a correction chart corresponding to the calibration condition is registered in the correction management DB 62A by the update processing part 60F described later.

The target characteristic indicates a characteristic serving as a target at the time when the update processing part 60F corrects the correction table. Although details will be described later, in the present embodiment, the update processing part 60F corrects the initial correction table 70A to generate the correction table corresponding to the calibration condition. The target characteristic indicates a characteristic serving as a target at the time when the initial correction table 70A is corrected. The target characteristic may also be referred to as a correction target. Details about the target characteristic will be described later.

The correction table is a γ correction table used for γ correction. For example, the initial correction table 70A is registered in the correction management DB 62A in advance. The initial correction table 70A is a γ correction table used for γ correction. The update processing part 60F corrects the initial correction table 70A using the target characteristic to generate the correction table corresponding to the calibration condition. For example, in the correction management DB 62A, correction tables (in FIG. 8, D1 to D4) corresponding to respective calibration conditions are registered through processing performed by the update processing part 60F described later. The processing performed by the update processing part 60F will be described later.

Next, the following describes the medium management DB 62B. FIG. 10 is a schematic diagram illustrating an example of a data configuration of the medium management DB 62B. In the medium management DB 62B, the medium ID is associated with the medium information. A data format of the medium management DB 62B is not specifically limited. The medium management DB 62B may be a database or a table, for example. In the present embodiment, it is assumed that the medium management DB 62B is registered in the storage part 62 in advance.

Returning to FIG. 7, the description will be continued. The following describes the update processing part 60F.

The update processing part 60F is a functional part that generates the correction table used for γ correction.

The update processing part 60F includes the UI control part 60G, the acquisition part 60H, the determination part 60I, the specification part 60J, the generation part 60K, and the update part 60L.

First, the following describes the acquisition part 60H.

The acquisition part 60H acquires the special color type information. In the present embodiment, the acquisition part 60H acquires the special color type information from the image forming device 12. When receiving an acquisition request for the special color type information, from the acquisition part 60H, the image forming device 12 transmits, to the information processing device 10, the special color type information indicating the type of the special color material currently loaded on the image forming device 12.

For example, it is assumed that a memory that stores therein the special color type information indicating the type of the special color material is loaded on an accumulation part accumulating the special color material loaded on the image forming device 12. In this case, the image forming device 12 reads the special color type information from the memory and transmits the special color type information to the information processing device 10. The user operating the image forming device 12 may input the special color type information of the special color material loaded on the image forming device 12 to store the special color type information in the memory of the image forming device 12. When receiving the acquisition request for the special color type information, from the information processing device 10, the image forming device 12 reads the special color type information from the storage part 62 and transmits the special color type information to the information processing device 10.

In this way, the acquisition part 60H acquires the special color type information of the special color material currently loaded on the image forming device 12.

The acquisition part 60H acquires the laminating order information. In the present embodiment, the acquisition part 60H acquires the laminating order information from the image forming device 12. The laminating order information is information indicating the laminating order of the special color image 52 and the colored image 54 with respect to the medium 40 in the laminated image 50 formed with a current configuration of the image forming device 12.

For example, the image forming device 12 specifies whether the positions of the colored image forming unit 32 and the special color image forming unit 33 are in a positional relation of forming the laminated image 50 in which the special color image 52 and the colored image 54 are laminated in this order with respect to the medium 40, or in a positional relation of forming the laminated image 50 in which the colored image 54 and the special color image 52 are laminated in this order with respect to the medium 40.

Specifically, a sensor for identifying the respective positions of the colored image forming unit 32 and the special color image forming unit 33 is arranged in the main body part 30 of the image forming device 12. The image forming device 12 specifies the laminating order information by specifying the positional relation between the colored image forming unit 32 and the special color image forming unit 33 using a detection signal from the sensor. When receiving the acquisition request for the laminating order information, from the information processing device 10, the image forming device 12 may transmit the laminating order information to the information processing device 10. Accordingly, the acquisition part 60H acquires the laminating order information from the image forming device 12.

The acquisition part 60H acquires the medium ID. In the present embodiment, the acquisition part 60H acquires the medium ID from the image forming device 12. For example, the image forming device 12 specifies the medium ID of the medium 40 accumulated in the sheet feeding tray 37. For example, the image forming device 12 specifies the medium ID input through an operation of the panel operation part 31 by the user. The image forming device 12 may specify the medium ID of the medium 40 by detecting the medium 40 accumulated in the sheet feeding tray 37 using a known method. The image forming device 12 then transmits the specified medium ID to the information processing device 10. Accordingly, the acquisition part 60H of the information processing device 10 acquires the medium ID from the image forming device 12.

The acquisition part 60H then associates the medium ID, the laminating order information, and the special color type information that have been acquired with the correction management DB 62A to be registered as new calibration conditions (refer to FIG. 8).

As described above with reference to FIG. 8, the calibration condition may further include information indicating whether to use the special color for calibration. This information is updated through an operation instruction from the user.

Figure 11:
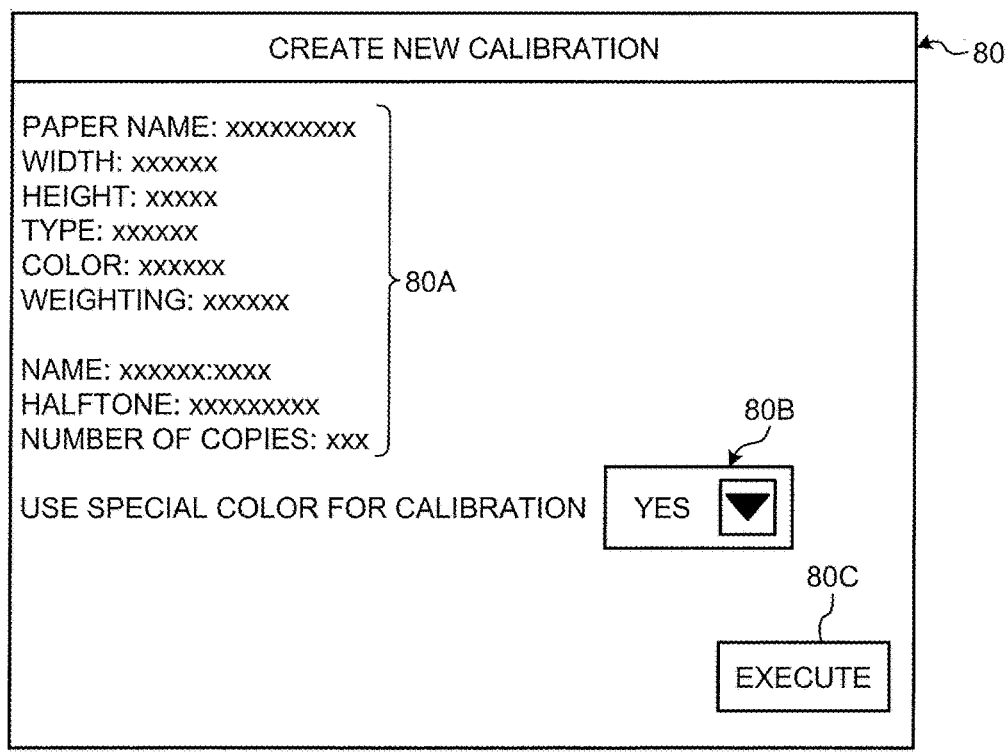
FIG. 11 is a diagram illustrating an example of a calibration condition display screen.

For example, the UI control part 60G causes the UI part 64 to display a display screen displaying the calibration condition. FIG. 11 is an example of a calibration condition display screen 80.

As illustrated in FIG. 11, the calibration condition display screen 80 includes a medium information display region 80A, a selection window 80B, and an execution button 80C.

The medium information display region 80A is a region for displaying the medium information of the medium 40 to be used for calibration. The UI control part 60G reads, from the medium management DB 62B, the medium information corresponding to the medium ID acquired by the acquisition part 60H, and displays the medium information in the medium information display region 80A. The calibration condition display screen 80 may further include at least one of the laminating order information and the special color type information acquired by the acquisition part 60H.

The selection window 80B is a window for selecting whether to use the special color for calibration. The user operates the selection window 80B using the UI part 64 to input whether to use the special color for calibration.

The execution button 80C is operated by the user to instruct to perform calibration based on content displayed on the calibration condition display screen 80. When the execution button 80C is operated by the user, the UI control part 60G outputs, to the acquisition part 60H, the information indicating whether to use the special color for calibration input through the calibration condition display screen 80.

Accordingly, the acquisition part 60H acquires the information indicating whether to use the special color for calibration, and registers the information in the correction management DB 62A.

Returning to FIG. 7, the description will be continued. The determination part 60I determines the image data 78 for a correction chart corresponding to the special color type information acquired by the acquisition part 60H.

In more detail, the determination part 60I determines the image data 78 for a correction chart by reading, from the storage part 62, the image data 76 for a special color correction chart corresponding to the special color type information acquired by the acquisition part 60H. Specifically, for example, in a case in which the special color type information is information indicating white, the determination part 60I reads, from the storage part 62, the image data 76 for a special color correction chart defining the special color value (white concentration value) of the patch region A of special color of white corresponding to the special color type information "white".

The storage part 62 previously stores therein one type of image data 77 for a colored correction chart (refer to FIG. 9(A)). Due to this, the determination part 60I reads the image data 77 for a colored correction chart from the storage part 62.

Accordingly, the determination part 60I determines the image data 78 for a correction chart including the image data 76 for a special color correction chart corresponding to the special color type information acquired by the acquisition part 60H and the image data 77 for a colored correction chart.

The acquisition part 60H may acquire information indicating that the special color is not used for calibration, from the user via the calibration condition display screen 80. In this case, the determination part 60I determines the image data 78 for a correction chart by reading only the image data 77 for a colored correction chart from the storage part 62.

Next, the following describes the specification part 60J.

The specification part 60J specifies the target characteristic using the image data 78 for a correction chart determined by the determination part 60I.

The target characteristic indicates a relation between a first colorimetric value of a first patch image P1 formed through the 2-path printing by the image forming device 12 using the image data 78 for a correction chart, and the color value of the image data 78 for a correction chart. The relation is represented as a chart or a function. In the present embodiment, described is a case in which the target characteristic is represented as a chart. The color value of the image data 78 for a correction chart used for the target characteristic is, specifically, the colored color value of the image data 77 for a colored correction chart included in the image data 78 for a correction chart.

Figure 12A:
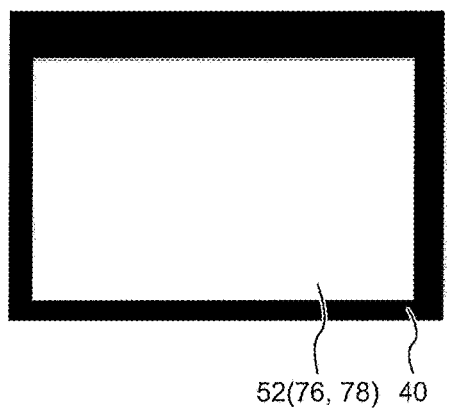
FIGS. 12A, 12B, and 12C are explanatory diagrams of an example of a patch image.
Figure 12B:
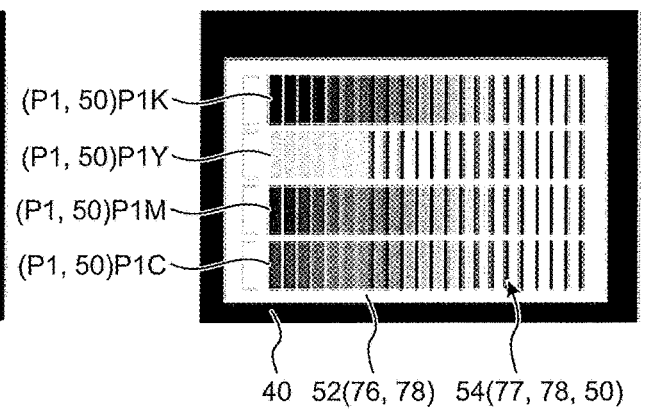

FIG. 12A and FIG. 12B are explanatory diagrams of an example of the first patch image P1 formed through the 2-path printing using the image data 78 for a correction chart.

For example, the laminating order information acquired by the acquisition part 60H is assumed to indicate that the special color image 52 and the colored image 54 are laminated in this order on the medium 40. Additionally, it is assumed that the determination part 60I determines the image data 76 for a special color correction chart and the image data 77 for a colored correction chart to be the image data 78 for a correction chart.

In this case, the specification part 60J transmits the determined image data 76 for a special color correction chart to the image forming device 12. By using the received image data 76 for a special color correction chart, the image forming device 12 forms the special color image 52 corresponding to the patch region A of special color shown in the image data 76 for a special color correction chart on the medium 40 to be fixed (the first path) (refer to FIG. 12A). The user sets the medium 40 to which the special color image 52 is fixed to the sheet feeding tray 37 of the image forming device 12 again.

Next, the specification part 60J transmits the determined image data 77 for a colored correction chart to the image forming device 12. By using the received image data 77 for a colored correction chart, the image forming device 12 forms the colored image 54 corresponding to the colored region B indicated by the image data 77 for a colored correction chart on the special color image 52 on the medium 40 to be fixed (the second path) (refer to FIG. 12B). Accordingly, the laminated image 50 corresponding to the image data 78 for a correction chart determined by the determination part 60I is formed on the medium 40 through the 2-path printing.

Through the 2-path printing, the first patch image P1 as the laminated image 50 corresponding to each patch region P' shown in the image data 78 for a correction chart is formed on the medium 40 (refer to FIG. 12B).

The colorimeter 14 measures a color of each first patch image P1 to obtain the first colorimetric value. The colorimeter 14 outputs the first calorimetric value of each of the first patch images P1 to the information processing device 10 via the host computer 16.

The specification part 60J of the information processing device 10 specifies the target characteristic indicating a relation between the colored color value indicated by each of the patch regions P' shown in the image data 78 for a correction chart determined by the determination part 60I and the first colorimetric value of the first patch image P1 corresponding to each of the patch regions P'.

Figure 13:
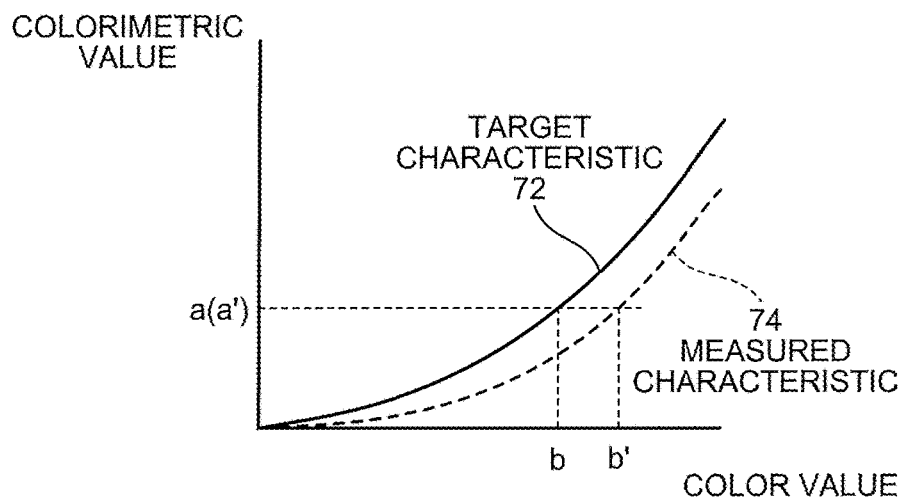
FIG. 13 is a chart illustrating an example of a target characteristic and a measured characteristic.

FIG. 13 is a chart illustrating an example of a relation between a target characteristic 72 and a measured characteristic 74. For example, the specification part 60J specifies the target characteristic 72 illustrated in FIG. 13. The specification part 60J specifies the target characteristic 72 indicating a relation between the color value (colored color value) and the colorimetric value (first calorimetric value).

Returning to FIG. 7, the description will be continued. Next, the following describes the generation part 60K. The generation part 60K generates the correction table using the image data 78 for a correction chart determined by the determination part 60I.

In more detail, first, the generation part 60K determines the measured characteristic using the image data 78 for a correction chart determined by the determination part 60I.

The measured characteristic indicates a relation between a second colorimetric value of a second patch image P2 formed through the 1-path printing by the image forming device 12 using the image data 78 for a correction chart determined by the determination part 60I, and the color value of the image data 78 for a correction chart. The relation is represented as a chart or a function. In the present embodiment, described is a case in which the measured characteristic is represented as a chart. The color value of the image data 78 for a correction chart used for the measured characteristic is, specifically, the colored color value of the image data 77 for a colored correction chart included in the image data 78 for a correction chart.

Figure 12C:
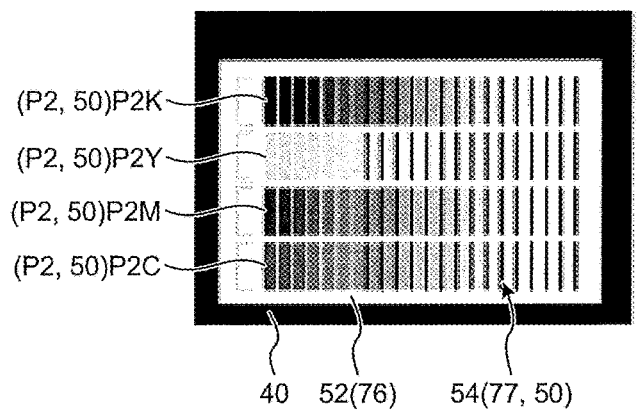

FIG. 12C is an explanatory diagram of an example of the second patch image P2 formed through the 1-path printing using the image data 78 for a correction chart.

For example, the laminating order information acquired by the acquisition part 60H is assumed to indicate that the special color image 52 and the colored image 54 are laminated in this order on the medium 40. Additionally, it is assumed that the determination part 60I determines the image data 76 for a special color correction chart and the image data 77 for a colored correction chart to be the image data 78 for a correction chart.

In this case, the determination part 60I transmits the determined image data 78 for a correction chart (the image data 76 for a special color correction chart, and the image data 77 for a colored correction chart) to the image forming device 12. By using the image data 76 for a special color correction chart included in the received image data 78 for a correction chart, the image forming device 12 forms the special color image 52 corresponding to the patch region A of special color on the medium 40, thereafter forms the colored image 54 corresponding to the colored region B on the special color image 52 using the image data 77 for a colored correction chart without performing fixing, and fixes the colored image 54 thereon (refer to FIG. 12C). Accordingly, the laminated image 50 corresponding to the image data 78 for a correction chart determined by the determination part 60I is formed on the medium 40 through the 1-path printing.

Through the 1-path printing, the second patch image P2 as the laminated image 50 corresponding to each patch region P' shown in the image data 78 for a correction chart is formed on the medium 40 (refer to FIG. 12C).

The colorimeter 14 measures a color of each second patch image P2 to obtain the second colorimetric value. The colorimeter 14 outputs the second colorimetric value of each of the second patch images P2 to the information processing device 10 via the host computer 16.

The generation part 60K of the information processing device 10 specifies the measured characteristic indicating a relation between the colored color value indicated by each of the patch regions P' shown in the image data 78 for a correction chart determined by the determination part 60I and the second calorimetric value of the second patch image P2 corresponding to each of the patch regions P'.

For example, the generation part 60K specifies the measured characteristic 74 illustrated in FIG. 13. The generation part 60K specifies the measured characteristic 74 indicating a relation between the color value (colored color value) and the colorimetric value (second colorimetric value).

At the time of forming the first patch image P1 and the second patch image P2 used for specifying the target characteristic 72 and the measured characteristic 74, the image forming device 12 is in a state indicated by the calibration condition acquired by the acquisition part 60H. That is, the medium 40 identified with the medium ID and the special color material of a type indicated by the special color type information are loaded on the image forming device 12, the medium ID and the special color type information being indicated by the calibration condition acquired by the acquisition part 60H, and the image forming device 12 is in a state in which the laminated image 50 can be formed in the laminating order indicated by the laminating order information included in the calibration condition.

Thus, the target characteristic 72 specified by the specification part 60J and the measured characteristic 74 specified by the generation part 60K are characteristics obtained from the laminated image 50 formed by the image forming device 12 under the same calibration condition using the same image data 78 for a correction chart. The target characteristic 72 specified by the specification part 60J is different from the measured characteristic 74 specified by the generation part 60K in that the target characteristic 72 is a characteristic obtained from the laminated image 50 formed through the 1-path printing, and the measured characteristic 74 is a characteristic obtained from the laminated image 50 formed through the 2-path printing.

The generation part 60K then generates the correction table for correcting the color value defined for the colored image data 20 so that the measured characteristic 74 comes close to the target characteristic 72. The generation part 60K preferably generates the correction table for correcting the color value so that the measured characteristic 74 is matched with the target characteristic 72.

Figure 14:
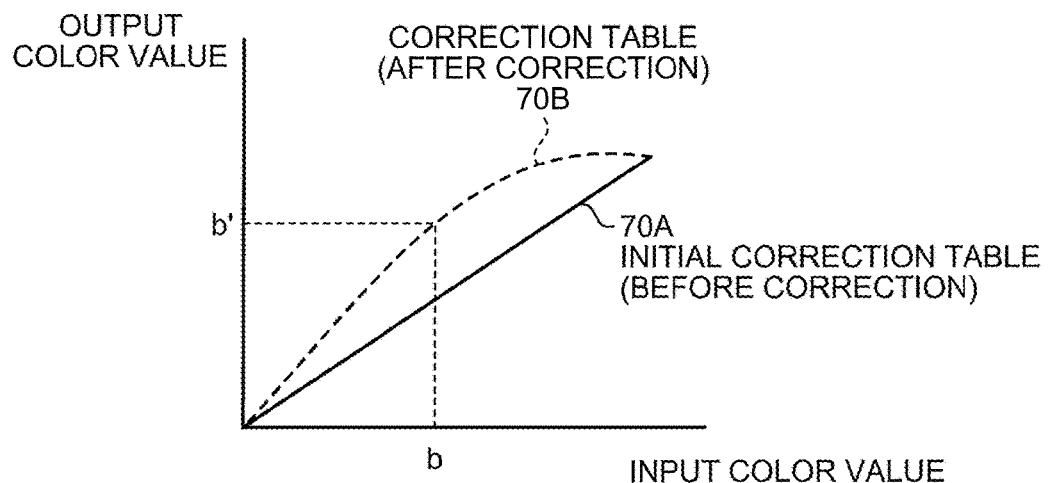
FIG. 14 is a schematic diagram illustrating an example of correction table generation.

FIG. 14 is a schematic diagram illustrating an example of correction table generation performed by the generation part 60K. In the present embodiment, the generation part 60K generates a correction table 70B by correcting the initial correction table 70A previously stored in the storage part 62.

In more detail, the generation part 60K generates the correction table 70B in which the color value in the target characteristic 72 is set to be an input color value, and the color value in the measured characteristic 74 corresponding to the second colorimetric value indicating the first colorimetric value of the target characteristic 72 is set to be an output color value.

Specifically, as illustrated in FIG. 13, the generation part 60K specifies a color value b' in the measured characteristic 74 corresponding to a second colorimetric value a' that is the same value as a first colorimetric value a corresponding to a color value b in the target characteristic 72. As illustrated in FIG. 13 and FIG. 14, the generation part 60K then generates the correction table 70B in which the color value b in the target characteristic 72 is set to be the input color value, and the color value b' in the measured characteristic 74 is set to be the output color value.

In the present embodiment, the generation part 60K generates the correction table 70B (refer to FIG. 14) for correcting the color value (colored color value) by correcting the initial correction table 70A so that the measured characteristic 74 illustrated in FIG. 13 comes close to the target characteristic 72.

The initial correction table 70A and the correction table 70B are tables in which the color value illustrated in the colored image data 20 (the colored color value, that is, the colored concentration value) is set to be the input color value, and the corrected color value is set to be the output color value.

That is, to achieve, through the 1-path printing, image quality similar to that of the laminated image 50 formed through the 2-path printing, the generation part 60K generates the correction table 70B for correcting the color value (the colored color value, the colored concentration value) of the colored image data 20.

The update part 60L associates the correction table 70B generated by the generation part 60K with the calibration condition acquired by the acquisition part 60H and registers them in the correction management DB 62A. Due to this, the update part 60L updates the initial correction table 70A to the correction table 70B.

Thus, the correction table 70B corresponding to the calibration condition is registered in the storage part 62.

The $\gamma$ correction part 60B described above performs $\gamma$ correction, using the correction table 70B, on the colored image data 20 (color image data 20C, 20M, 20Y, and 20K) of each color of CMYK included in the image data 24 received from the host computer 16 via the color conversion processing part 60A. At this point in time, the $\gamma$ correction part 60B acquires the calibration condition similarly to the acquisition part 60H, and performs $\gamma$ correction using the correction table 70B corresponding to the calibration condition based on a current setting of the image forming device 12. The transmission part 60E then outputs, to the image forming device 12, the image data 24 that is $\gamma$-corrected by the $\gamma$ correction part 60B and processed by the total quantity regulation part 60C and the halftone processing part 60D.

Next, the following describes an example of an information processing procedure at the time when the correction table is updated performed by the control part 60 of the information processing device 10.

Figure 15:
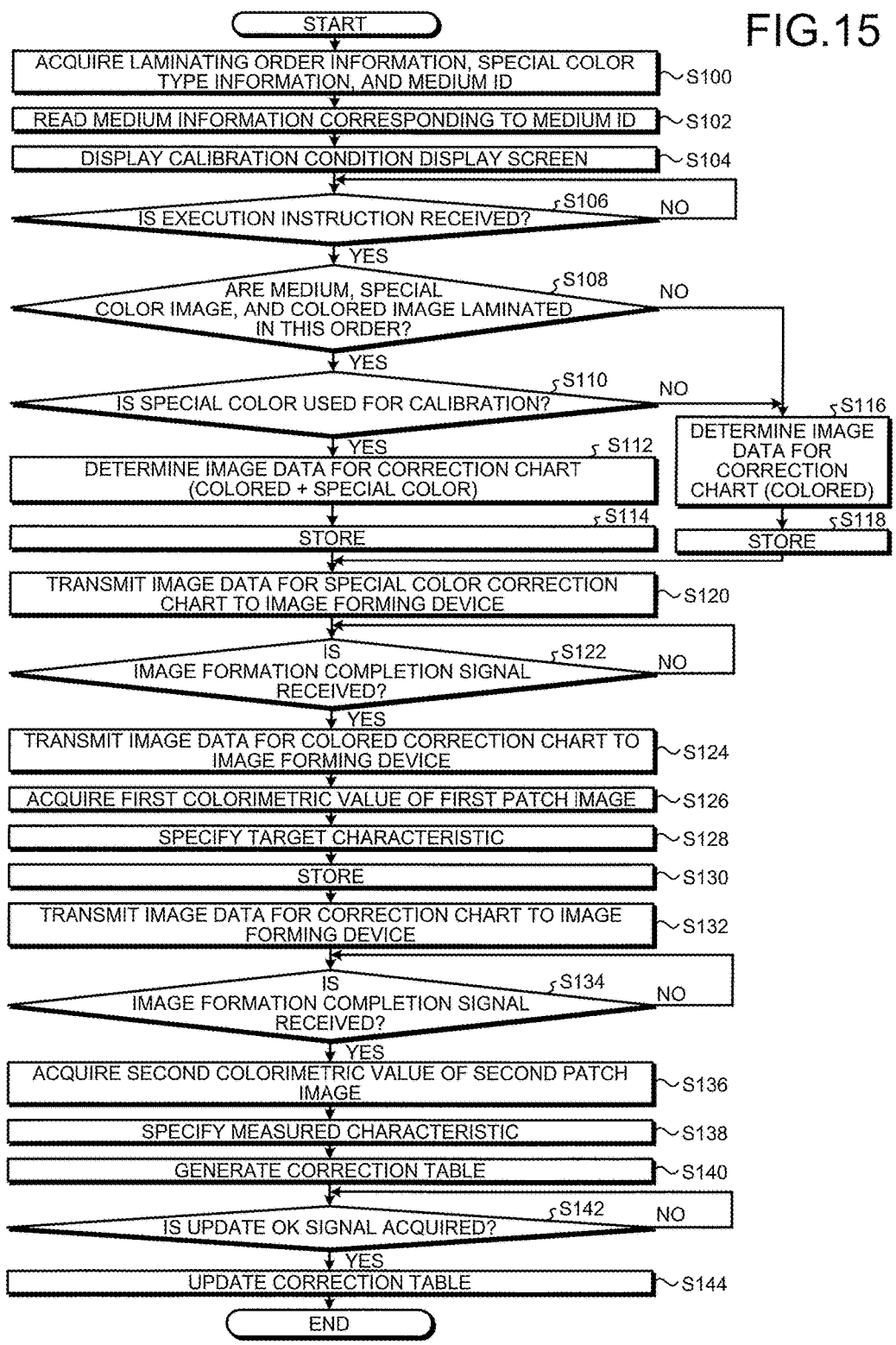
FIG. 15 is a flowchart illustrating an example of an information processing procedure.

FIG. 15 is a flowchart illustrating an example of the information processing procedure at the time when the correction table is updated performed by the control part 60 of the information processing device 10.

First, the acquisition part 60H acquires, from the image forming device 12, the laminating order information, the special color type information, and the medium ID (Step S100).

Next, the acquisition part 60H reads the medium information corresponding to the medium ID acquired at Step S100 from the medium management DB 62B (Step S102). Subsequently, the acquisition part 60H displays the calibration condition display screen 80 including the medium information read at Step S102 on the UI part 64 (Step S104) (refer to FIG. 11).

The user refers to the calibration condition display screen 80 and operates the selection window 80B to input the information indicating whether to use the special color for calibration. The user then operates the execution button 80C.

Next, the acquisition part 60H repeats negative determination (No at Step S106) until it is determined that an execution instruction is received (Yes at Step S106). The acquisition part 60H makes determination at Step S106 by determining whether the execution button 80C is operated. If positive determination is made at Step S106 (Yes at Step S106), the process proceeds to Step S108.

Next, the determination part 60I determines whether the laminating order indicated by the laminating order information acquired at Step S100 is such that the special color image 52 and the colored image 54 are laminated on the medium 40 in this order (Step S108).

If positive determination is made at Step S108 (Yes at Step S108), the process proceeds to Step S110. At Step S110, the determination part 60I determines whether to use the special color for calibration (Step S110). If positive determination is made at Step S110 (Yes at Step S110), the process proceeds to Step S112. At Step S112, the determination part 60I determines the image data 77 for a colored correction chart and the image data 76 for a special color correction chart to be the image data 78 for a correction chart (Step S112). At this point in time, the determination part 60I determines the image data 76 for a special color correction chart corresponding to the special color type information acquired at Step S100.

The determination part 60I associates the laminating order information, the special color type information, and the medium ID that are acquired at Step S100, the information indicating that the special color is "used" for calibration, and the image data 78 for a correction chart determined at Step S112 with each other, and stores them in the correction management DB 62A (Step S114). The process then proceeds to Step S120.

On the other hand, if negative determination is made at Step S108 (No at Step S108), the process proceeds to Step S116. If negative determination is made at Step S110 (No at Step S110), the process proceeds to Step S116.

At Step S116, the determination part 60I determines the image data 77 for a colored correction chart to be the image data 78 for a correction chart (Step S116).

The determination part 60I then associates the laminating order information, the special color type information, and the medium ID that are acquired at Step S100, the information indicating the determination result ("not to use" the special color for calibration) at Step S110, and the image data 78 for a correction chart determined at Step S116 with each other, and stores them in the correction management DB 62A (Step S118). The process then proceeds to Step S120.

At Step S120, the determination part 60I transmits the image data 76 for a special color correction chart determined at Step S112 to the image forming device 12 (Step S120). The image forming device 12 forms the special color image 52 corresponding to the patch region A of special color shown in the image data 76 for a special color correction chart on the medium 40 to be fixed, using the received image data 76 for a special color correction chart (the first path) (refer to FIG. 12A). The user sets the medium 40 to which the special color image 52 is fixed to the sheet feeding tray 37 of the image forming device 12 again. When image formation on the medium 40 is ended, the image forming device 12 outputs an image formation completion signal to the information processing device 10.

The determination part 60I of the information processing device 10 repeats negative determination (No at Step S122) until it is determined that the image formation completion signal is received (Yes at Step S122). If positive determination is made at Step S122 (Yes at Step S122), the process proceeds to Step S124.

At Step S124, the determination part 60I transmits the image data 77 for a colored correction chart determined at Step S112 or Step S116 to the image forming device 12 (Step S124). The image forming device 12 forms the colored image 54 corresponding to the colored region B shown in the image data 77 for a colored correction chart on the special color image 52 on the medium 40 to be fixed, using the received image data 77 for a colored correction chart (the second path) (refer to FIG. 12B).

Through the processing from Step S120 to Step S124, the laminated image 50 corresponding to the image data 78 for a correction chart determined at Step S112 or Step S116 is formed on the medium 40 through the 2-path printing. At Step S116, only the image data 77 for a colored correction chart is determined to be the image data 78 for a correction chart, so that only the colored image 54 is formed on the medium 40 in this case.

Next, the specification part 60J acquires, from the colorimeter 14, the first colorimetric value of each first patch image P1 (refer to FIG. 12B) as the laminated image 50 formed on the medium 40 through the 2-path printing after the processing from Step S120 to Step S124 (Step S126).

The specification part 60J then specifies the target characteristic 72 indicating a relation between the colored color value indicated by each of the patch regions P' shown in the image data 77 for a colored correction chart determined at Step S112 or Step S116, and the first colorimetric value of the first patch image P1 corresponding to each of the patch regions P' (Step S128). Through the processing at Step S128, for example, the target characteristic 72 illustrated in FIG. 13 is specified.

The specification part 60J then stores, in the correction management DB 62A, the target characteristic 72 specified at Step S128 being associated with the calibration condition (the laminating order information, the special color type information, and the medium ID) acquired at Step S100 (Step S130).

Next, the generation part 60K transmits the image data 78 for a correction chart determined at Step S112 or Step S116 to the image forming device 12 (Step S132).

After forming the special color image 52 corresponding to the patch region A of special color on the medium 40 using the image data 76 for a special color correction chart included in the received image data 78 for a correction chart, the image forming device 12 forms the colored image 54 corresponding to the colored region B on the special color image 52 using the image data 77 for a colored correction chart without performing fixation, and fixes the colored image 54 (refer to FIG. 12C). Due to this, the laminated image 50 corresponding to the image data 78 for a correction chart determined by the determination part 60I is formed on the medium 40 through the 1-path printing. When image formation on the medium 40 is ended, the image forming device 12 transmits the image formation completion signal to the information processing device 10.

The generation part 60K of the information processing device 10 repeats negative determination (No at Step S134) until it is determined that the image formation completion signal is received from the image forming device 12 (Yes at Step S134). If positive determination is made at Step S134 (Yes at Step S134), the process proceeds to Step S136.

At Step S136, the generation part 60K acquires, from the colorimeter 14, the second colorimetric value of each second patch image P2 (refer to FIG. 12C) as the laminated image 50 formed on the medium 40 through the 1-path printing after the processing from Step 132 to Step S134 (Step S136).

The generation part 60K then specifies the measured characteristic 74 indicating a relation between the colored color value indicated by each of the patch regions P' shown in the image data 78 for a correction chart (image data 77 for a colored correction chart) determined at Step S112 or Step S116, and the second colorimetric value of the second patch image P2 corresponding to each of the patch regions P' (Step S138) (refer to FIG. 13).

The generation part 60K then generates the correction table 70B for correcting the color value so that the measured characteristic 74 specified at Step S138 comes closer to the target characteristic 72 specified at Step S128 (Step S140).

Next, the update part 60L repeats negative determination (No at Step S142) until it is determined that an update OK signal indicating update OK is acquired (Yes at Step S142). For example, when a button image indicating update OK is operated when the user operates the UI part 64, the update part 60L receives the update OK signal from the UI part 64. The update part 60L then determines whether the update OK signal is received from the UI part 64 to make determination at Step S142.

If positive determination is made at Step S142 (Yes at Step S142), the process proceeds to Step S144. At Step S144, the correction table 70B generated at Step S140 is registered in the correction management DB 62A being associated with the calibration condition acquired at Step S100. Due to this, the update part 60L updates the correction table. This routine is then ended.

Figure 16:
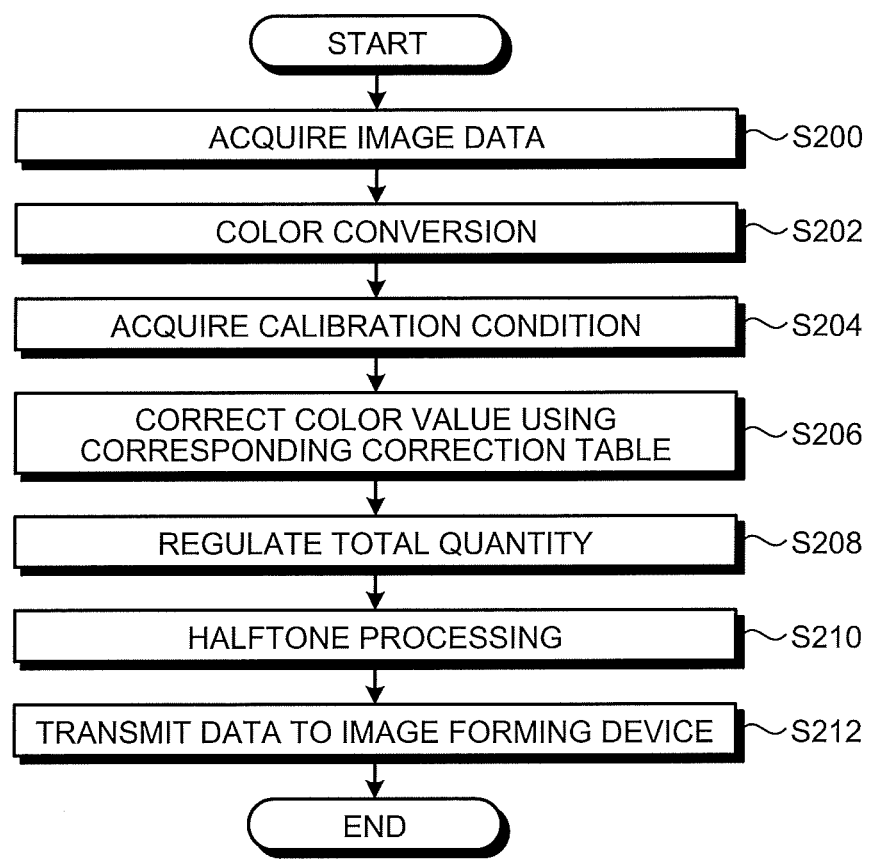
FIG. 16 is a flowchart illustrating an example of an information processing procedure.

Next, the following describes an example of an information processing procedure performed by the information processing device 10 when the image data 24 is received from the host computer 16. FIG. 16 is a flowchart illustrating an example of the information processing procedure that is performed at the time when the image data 24 is received.

First, the color conversion processing part 60A acquires the image data 24 from the host computer 16 (Step S200). Next, the color conversion processing part 60A performs color conversion processing on the colored image data 20 included in the image data 24 acquired at Step S200 (Step S202).

Next, the γ correction part 60B acquires the calibration condition (Step S204). For example, the γ correction part 60B acquires, from the image forming device 12, the laminating order information, the special color type information, and the medium ID as the calibration condition. At this point in time, the γ correction part 60B may acquire, from the image forming device 12, the information indicating whether to use the special color for calibration. The γ correction part 60B may acquire, from the UI part 64, the information indicating whether to use the special color for calibration.

Next, the γ correction part 60B corrects (γ-corrects) the color value of the colored image data 20 on which color conversion is performed at Step S202 using the correction table 70B corresponding to the calibration condition acquired at Step S204 in the correction management DB 62A (Step S206).

Next, the total quantity regulation part 60C performs total quantity regulation processing using the colored image data 20 that is γ-corrected at Step S206 and the special color image data 22 included in the image data 24 acquired at Step S200 (Step S208).

Next, the halftone processing part 60D performs halftone processing on the colored image data 20 (color image data 20C, 20M, 20Y, and 20K) and the special color image data 22 on which total quantity regulation processing is performed at Step S208 (Step S210). The transmission part 60E transmits, to the image forming device 12, the image data 24 (the colored image data 20, the special color image data 22) on which halftone processing is performed by the halftone processing part 60D (Step S212). This routine is then ended.

As described above, the information processing device 10 according to the present embodiment controls the image forming device 12 (image forming part). The image forming device 12 forms the laminated image 50 of the special color image 52 using the special color material and the colored image 54 using the colored color material through the 2-path printing or the 1-path printing. In the 2-path printing, after forming one of the special color image 52 and the colored image 54 on the medium 40 to be immobilized, the other one thereof is laminated thereon. In the 1-path printing, after forming one of the special color image 52 and the colored image 54 on the medium 40, the other one thereof is laminated thereon without performing immobilization.

The information processing device 10 includes the specification part 60J and the generation part 60K. The specification part 60J specifies the target characteristic 72 indicating a relation between the color value and the first colorimetric value of the first patch image P1 as the laminated image 50 corresponding to each patch region P' formed through the 2-path printing by the image forming device 12 using the image data 78 for a correction chart defining the patch regions P' having different color values. The generation part 60K generates the correction table for correcting the color value so that the measured characteristic 74 comes close to the target characteristic 72, the measured characteristic 74 indicating a relation between the color value and the second colorimetric value of the second patch image P2 as the laminated image 50 corresponding to each patch region P' formed through the 1-path printing by the image forming device 12 using the image data 78 for a correction chart.

In this way, the information processing device 10 according to the present embodiment generates the correction table 70B for correcting the color value so that the measured characteristic 74 indicating a relation between the color value and the second colorimetric value of the second patch image P2 formed through the 1-path printing using the image data 78 for a correction chart comes close to the target characteristic 72 indicating a relation between the color value and the first colorimetric value of the first patch image P1 formed through the 2-path printing using the image data 78 for a correction chart. That is, the information processing device 10 generates the correction table 70B for correcting the color value (the colored color value, the colored concentration value) of the image data to achieve, through the 1-path printing, image quality that is substantially equal to that of the laminated image 50 formed through the 2-path printing.

By forming the laminated image 50 on the medium 40 through the 1-path printing using the image data the color value of which is corrected by using the correction table 70B, the image forming device 12 can form, through the 1-path printing, the laminated image 50 having image quality equal to that obtained through the 2-path printing.

Accordingly, with the information processing device 10 according to the present embodiment, image quality of the laminated image 50 of the special color image 52 and the colored image 54 can be improved.

In other words, the information processing device 10 according to the present embodiment can provide the correction table 70B that can improve the image quality of the laminated image 50 formed through the 1-path printing.

The acquisition part 60H acquires the special color type information indicating the type of the special color material used for image formation. The determination part 60I determines the image data 78 for a correction chart corresponding to the special color type information. The specification part 60J determines the target characteristic 72 using the determined image data 78 for a correction chart. The generation part 60K generates the correction table 70B using the determined image data 78 for a correction chart.

The determination part 60I determines the image data 78 for a correction chart including the image data 76 for a special color correction chart and the image data 77 for a colored correction chart. The image data 76 for a special color correction chart defines the special color value of the patch region A of special color with the special color material of a type indicated by the special color type information. The image data 77 for a colored correction chart defines the colored color value of the colored region B with the colored color material.

The image forming device 12 is configured to be able to switch the laminating order of the colored image 54 and the special color image 52 with respect to the medium 40. The acquisition part 60H acquires the laminating order information indicating the laminating order from the image forming device 12. The specification part 60J specifies the target characteristic 72 indicating a relation between the color value and the first colorimetric value of the first patch image P1 using the image data 78 for a correction chart determined by the determination part 60I, the first patch image P1 being formed on the medium 40 by the image forming device 12 through the 2-path printing with the special color material of a type indicated by the special color type information acquired by the acquisition part 60H in the laminating order indicated by the acquired laminating order information. The generation part 60K generates the correction table 70B so that the measured characteristic 74 is matched with the target characteristic 72 using the image data 78 for a correction chart determined by the determination part 60I, the measured characteristic 74 indicating a relation between the color value and the second colorimetric value of the second patch image P2 formed on the medium 40 through the 1-path printing by the image forming device 12 with the special color material of a type indicated by the special color type information acquired by the acquisition part 60H in the laminating order indicated by the acquired laminating order information.

The γ correction part 60B (correction part) corrects the color value of the image data 24 as a formation target using the correction table 70B. The transmission part 60E transmits the corrected image data 24 to the image forming device 12.

The special color material is a color material indicating any of a metal color, white, a transparent color, and a fluorescent color.

The information processing method according to the present embodiment is a control method for controlling the image forming device 12 that forms the laminated image 50 of the special color image 52 using the special color material and the colored image 54 using the colored color material through the 2-path printing in which one of the special color image 52 and the colored image 54 is formed on the medium 40 to be immobilized and the other one thereof is laminated thereon, or the 1-path printing in which one of the special color image 52 and the colored image 54 is formed on the medium 40 and the other one thereof is laminated thereon without performing immobilization.

The information processing method according to the present embodiment is an information processing method including: specifying the target characteristic 72 indicating a relation between the color value and the first colorimetric value of the first patch image P1 as the laminated image 50 corresponding to each patch region P' formed through the 2-path printing by the image forming device 12 using the image data 78 for a correction chart defining the patch regions P' having different color values; and generating the correction table 70B for correcting the color value so that the measured characteristic 74 comes close to the target characteristic 72, the measured characteristic 74 indicating a relation between the color value and the second colorimetric value of the second patch image P2 as the laminated image 50 corresponding to each patch region P' formed through the 1-path printing by the image forming device 12 using the image data 78 for a correction chart.

The information processing program according to the present embodiment is an information processing program to be executed by a computer for controlling the image forming device 12 that forms the laminated image 50 of the special color image 52 using the special color material and the colored image 54 using the colored color material through the 2-path printing in which one of the special color image 52 and the colored image 54 is formed on the medium 40 to be immobilized and the other one thereof is laminated thereon, or the 1-path printing in which one of the special color image 52 and the colored image 54 is formed on the medium 40 and the other one thereof is laminated thereon without performing immobilization.

The information processing program according to the present embodiment includes: specifying the target characteristic 72 indicating a relation between the color value and the first colorimetric value of the first patch image P1 as the laminated image 50 corresponding to each patch region P' formed through the 2-path printing by the image forming device 12 using the image data 78 for a correction chart defining the patch regions P' having different color values; and generating the correction table 70B for correcting the color value so that the measured characteristic 74 comes close to the target characteristic 72, the measured characteristic 74 indicating a relation between the color value and the second colorimetric value of the second patch image P2 as the laminated image 50 corresponding to each patch region P' formed through the 1-path printing by the image forming device 12 using the image data 78 for a correction chart.

In the embodiment described above, described is a form in which the information processing device 10 is connected to the host computer 16 in a communicable manner by way of example. Alternatively, only the information processing device 10 may be provided without providing the host computer 16. In this case, the colorimeter 14 is connected to the information processing device 10 so as to exchange data or a signal with each other.

First Modification

In the embodiment described above, described is a form in which the update processing part 60F generates the correction table 70B in accordance with the calibration condition of the image forming device 12. However, in a case in which the setting of the image forming device 12 is fixed, the update processing part 60F generates the correction table 70B corresponding to one type of calibration condition based on the fixed setting.

For example, it is assumed that white toner is loaded on the image forming device 12, and the image forming device 12 is configured to form the special color image 52 and the colored image 54 on the medium 40 in this order to form the laminated image 50. It is also assumed that only the medium 40 indicated by the medium information corresponding to a specific medium ID is loaded on the sheet feeding tray 37 as the medium 40.

In this case, the image data 77 for a colored correction chart and the image data 76 for a special color correction chart corresponding to the special color type information "white" are previously stored in the storage part 62 of the information processing device 10 as the image data 78 for a correction chart. The update processing part 60F of the information processing device 10 performs processing from Step S120 to Step S144 after determining the image data 78 for a correction chart by reading the image data 76 for a special color correction chart and the image data 77 for a colored correction chart stored in the storage part 62 without performing processing from Step S100 to Step S118 in FIG. 15.

In this way, when the calibration condition of the image forming device 12 is fixed, the same effect as that in the above embodiment can be obtained, and the information processing performed by the information processing device 10 can be simplified.

Second Embodiment

In the present embodiment, described is a form of further rectifying the correction table 70B.

Figure 17:
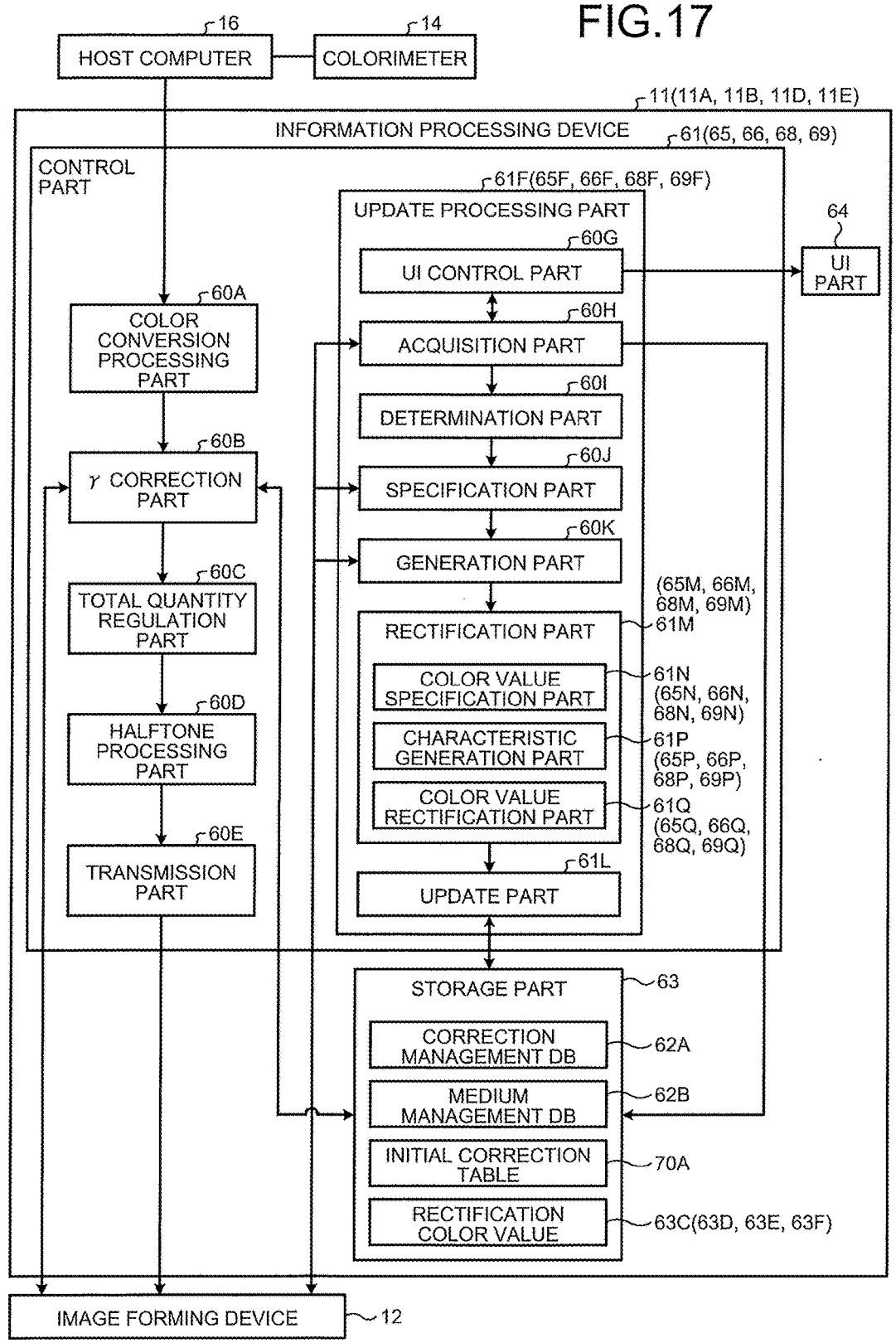
FIG. 17 is an example of a block diagram illustrating a functional configuration of the information processing device.

FIG. 17 is a block diagram illustrating a functional configuration of the information processing device 11 according to the present embodiment.

The information processing device 11 includes a control part 61, the UI part 64, and a storage part 63. The UI part 64 and the storage part 63 are connected to the control part 61 so as to exchange data or a signal with each other.

The UI part 64 is the same as that in the first embodiment. The storage part 63 is the same as the storage part 62 in the first embodiment except that the storage part 63 further stores therein a rectification color value.

The control part 61 includes the color conversion processing part 60A, the γ correction part 60B, the total quantity regulation part 60C, the halftone processing part 60D, the transmission part 60E, and an update processing part 61F. The control part 61 is the same as the control part 60 in the first embodiment except that the control part 61 includes the update processing part 61F in place of the update processing part 60F.

The update processing part 61F includes the UI control part 60G, the acquisition part 60H, the determination part 60I, the specification part 60J, the generation part 60K, an update part 61L, and a rectification part 61M. The UI control part 60G, the acquisition part 60H, the determination part 60I, the specification part 60J, and the generation part 60K are the same as those in the first embodiment.

Similarly to the first embodiment, the determination part 60I determines the image data 78 for a correction chart. Specifically, the determination part 60I determines the image data 78 for a correction chart including the image data 76 for a special color correction chart and the image data 77 for a colored correction chart.

FIG. 18 is a schematic diagram illustrating an example of the image data 77 for a colored correction chart. As described above, the image data 78 for a correction chart is data defining a plurality of patch regions P' having different color values. The patch region P' is a laminated region of the patch region A of special color and the colored region B. The image data 77 for a colored correction chart defines a plurality of colored regions B having different color values of K color, Y color, M color, and C color in each patch region P'.

In the present embodiment, described is a case of using a gradation value as the color value by way of example.

Similarly to the first embodiment, the specification part 60J specifies the target characteristic 72 using the image data 78 for a correction chart determined by the determination part 60I. A chart representing the target characteristic 72 is, for example, the chart illustrated in FIG. 13. The target characteristic 72 represented in a table is, for example, the table illustrated in FIG. 19. FIG. 19 is a diagram illustrating an example of the target characteristic 72.

Similarly to the first embodiment, the generation part 60K generates the measured characteristic 74 using the image data 78 for a correction chart determined by the determination part 60I. A chart representing the measured characteristic 74 is, for example, the chart illustrated in FIG. 13.

Figure 21:
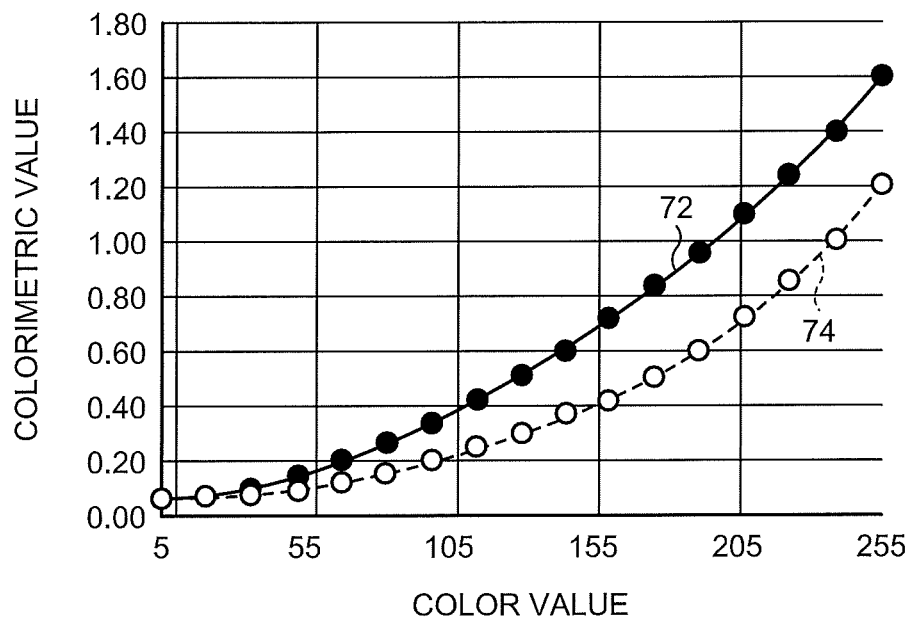
FIG. 21 is an example of a chart illustrating the target characteristic and the measured characteristic.

FIG. 20 is an example of a diagram representing the target characteristic 72 and the measured characteristic 74 in a table. FIG. 20 illustrates only the target characteristic 72 and the measured characteristic 74 of K color. FIG. 21 is a chart representing the target characteristic 72 and the measured characteristic 74 illustrated in FIG. 20.

When a relation between the color value and the first calorimetric value illustrated in FIG. 20 is obtained, a chart representing the target characteristic 72 indicating the relation is the chart illustrated in FIG. 21. When a relation between the color value and the second calorimetric value illustrated in FIG. 20 is obtained, a chart of the measured characteristic 74 indicating the relation is the chart illustrated in FIG. 21.

Figure 22:
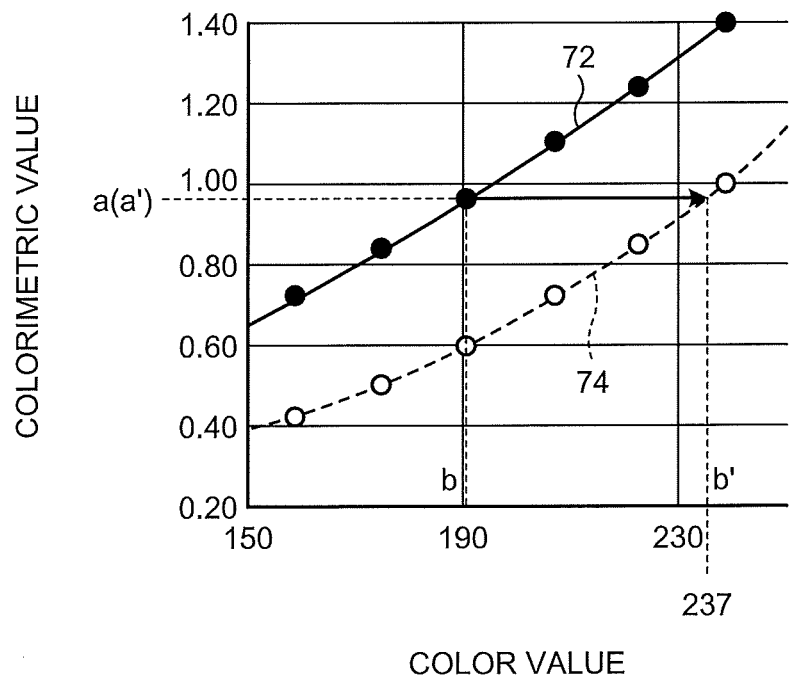
FIG. 22 is an enlarged view of part of FIG. 21.

Similarly to the first embodiment, the generation part 60K generates the correction table 70B for correcting the color value defined in the colored image data 20 so that the measured characteristic 74 comes close to the target characteristic 72 (refer to FIG. 14). FIG. 22 is an enlarged view of part of FIG. 21. As illustrated in FIG. 22, the generation part 60K specifies the color value b' in the measured characteristic 74 corresponding to the second colorimetric value a' that is the same value as the first calorimetric value a corresponding to the color value b in the target characteristic 72. The generation part 60K then similarly derives the color value b in the target characteristic 72 and the color value b' in the measured characteristic 74 for the calorimetric value (the first calorimetric value, the second calorimetric value) of each patch image P' indicated by the target characteristic 72 and the measured characteristic 74.

The generation part 60K then generates the correction table 70B in which the color value b in the target characteristic 72 is set to be the input color value and the color value b' in the measured characteristic 74 is set to be the output color value for each of a plurality of combinations of the color value b and the color value b' derived for each colorimetric value.

For example, a description is made using the color value of "191". The generation part 60K specifies the first calorimetric value of "0.96" corresponding to the color value of "191" in the target characteristic 72 (refer to FIG. 20 to FIG. 22). The generation part 60K then specifies the color value of "237" corresponding to the second calorimetric value of "0.96" in the measured characteristic 74 (refer to FIG. 20 to FIG. 22).

The generation part 60K then derives the color value of "191" as the color value b to be the input color value, and derives the color value of "237" as the color value b' to be the output color value. Similarly, the generation part 60K performs similar processing for each calorimetric value of the other patch images P', and derives the color value b in the target characteristic 72 and the color value b' in the measured characteristic 74 to generate the correction table 70B.

The color of the second calorimetric value that is the same value as the first calorimetric value is not measured as the calorimetric value of the measured characteristic 74 in some cases. In this case, the generation part 60K may specify the color value in the measured characteristic 74 by interpolating between the color values corresponding to two second calorimetric values most approximate to the first colorimetric value. Examples of interpolation include linear interpolation and spline interpolation.

For example, the generation part 60K specifies two second calorimetric values of "0.85" and "1.00" approximate to the first calorimetric value of "0.96" corresponding to the color value of "191" in the target characteristic 72 in FIG. 20. The generation part 60K linearly interpolates a point indicating the second colorimetric value of "0.85" and a point indicating the second colorimetric value of "1.00" in the measured characteristic 74. Due to this, the generation part 60K specifies the color value of "237" corresponding to the second colorimetric value of "0.96" in the measured characteristic 74. The generation part 60K generates the correction table 70B using the specified color value.

Figure 23:
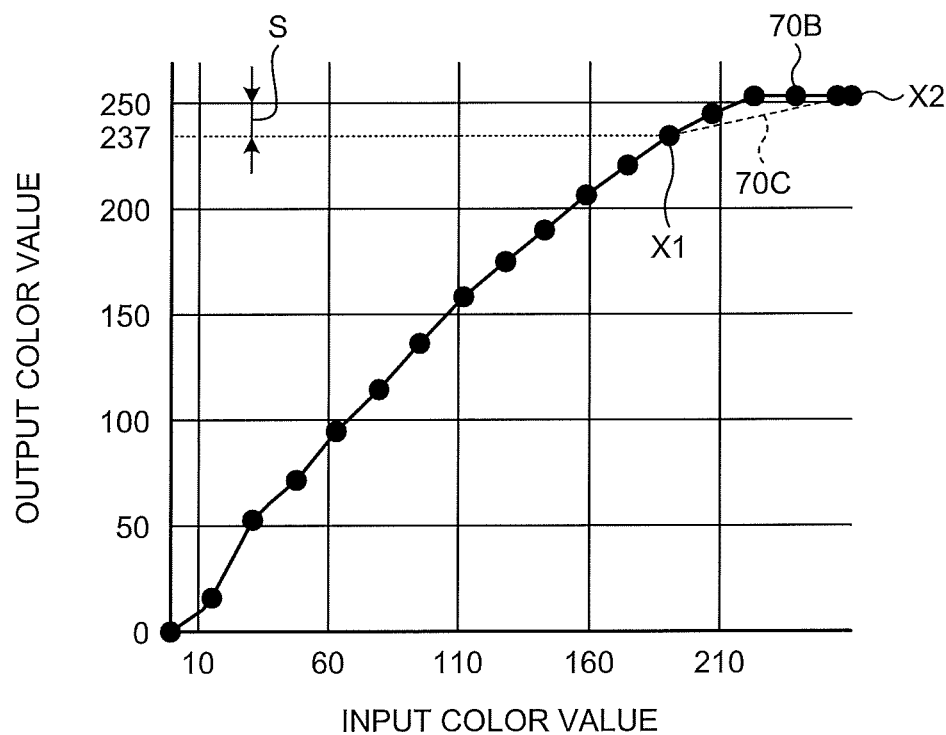
FIG. 23 is a chart illustrating an example of the correction table.

FIG. 23 is a chart representing an example of the correction table 70B. FIG. 23 is an example of the correction table 70B generated by using the target characteristic 72 and the measured characteristic 74 illustrated in FIG. 20 to FIG. 22.

Returning to FIG. 17, the description will be continued. Similarly to the first embodiment, it is assumed that the γ correction part 60B γ-corrects the color value (the concentration value, the gradation value) of the colored image data 20 (color image data 20C, 20M, 20Y, and 20K) by using the correction table 70B. The γ-corrected colored image data 20 and special color image data 22 are assumed to be output to the image forming device 12 via the total quantity regulation part 60C, the halftone processing part 60D, and the transmission part 60E.

Thus, the colorimetric value of the laminated image 50 formed through the 1-path printing using the γ-corrected colored image data 20 becomes a value corrected through γ correction.

FIG. 24 is a diagram illustrating a relation between the correction table 70B indicating a relation between the input color value and the output color value and the calorimetric value of the laminated image 50 (hereinafter, referred to as a colorimetric value after γ correction) formed through the 1-path printing using the colored image data 20 the color value of which is corrected with the correction table 70B. A gradation number of the input color value or the output color value represented as a gradation value, and a value of the gradation value are not limited to the form illustrated in FIG. 24.

Figure 25:
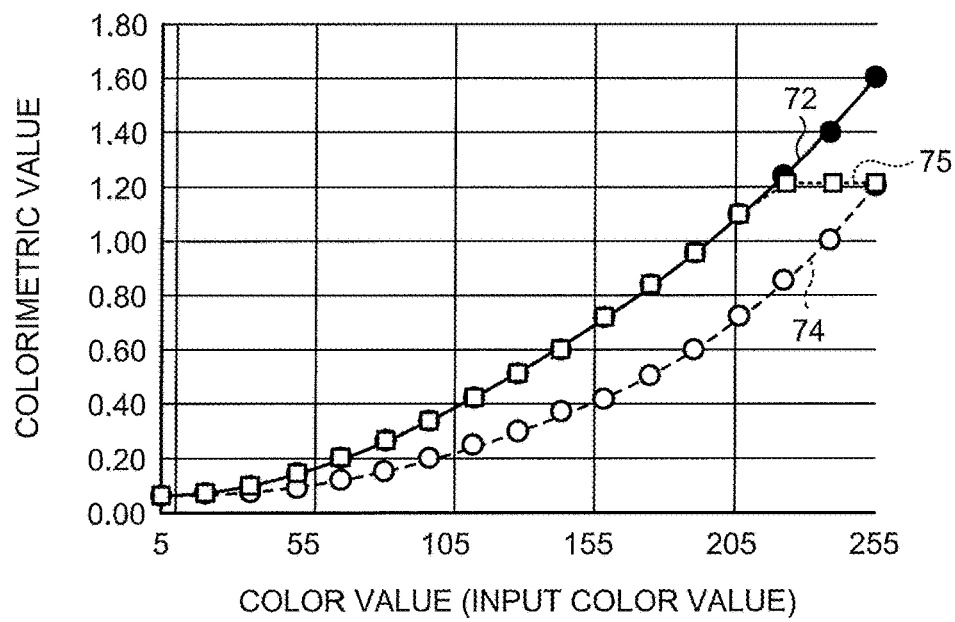
FIG. 25 is a schematic diagram illustrating an example of the target characteristic, the measured characteristic, and a characteristic after γ conversion.

FIG. 25 is a schematic diagram illustrating the target characteristic 72, the measured characteristic 74, and the characteristic after γ conversion 75. The characteristic after γ conversion 75 indicates a relation between the color value and a colorimetric value after γ correction using the correction table 70B.

As indicated by the characteristic after γ conversion 75 in FIG. 24 and FIG. 25, the colorimetric value after γ correction of the laminated image 50 formed through the 1-path printing using the colored image data 20 that is γ-corrected by using the correction table 70B is saturated as the color value comes closer to the maximum color value (for example, the gradation value of "255"). This is because the correction table 70B is a correction table for achieving, through the 1-path printing, image quality substantially the same as that of the laminated image 50 formed through the 2-path printing.

Thus, when the laminated image 50 is formed through the 1-path printing using the colored image data 20 that is γ-corrected by using the correction table 70B, a difference corresponding to a difference in the color value of the colored image data 20 is hardly caused in the calorimetric value after γ correction of the laminated image 50 to be formed as the color value (gradation value) defined in the colored image data 20 is larger in some cases.

Thus, the correction table 70B is rectified in the present embodiment. Returning to FIG. 17, the description will be continued. The rectification part 61M rectifies the correction table 70B generated by the generation part 60K.

The description is made with reference to FIG. 23. The rectification part 61M rectifies the output color value in a rectification range S from a predetermined rectification color value to the maximum color value in the correction table 70B to be an output color value that increases monotonically.

The rectification range S is a range of the output color value from a predetermined rectification color value to the maximum color value that is the maximum value of the output color value in the correction table 70B.

The rectification color value is an output color value indicating a lower limit of the rectification range S. FIG. 23 illustrates a case in which the rectification color value is "237" by way of example. The rectification color value may be determined in advance. For example, the rectification color value may be an output color value the increase in which starts to be saturated with respect to increase in the input color value in the correction table 70B.

In the present embodiment, the update processing part 61F previously measures the rectification color value satisfying the condition described above, and stores the rectification color value in the storage part 63 in advance (refer to a rectification color value 63C in FIG. 17). The rectification part 61M may read the rectification color value from the storage part 63 and use the rectification color value for rectifying the correction table 70B.

The rectification part 61M rectifies the output color value in the rectification range S in the correction table 70B to be the output color value that increases monotonically with respect to increase in the input color value, the output color value not being constant or substantially constant.

Figure 26:
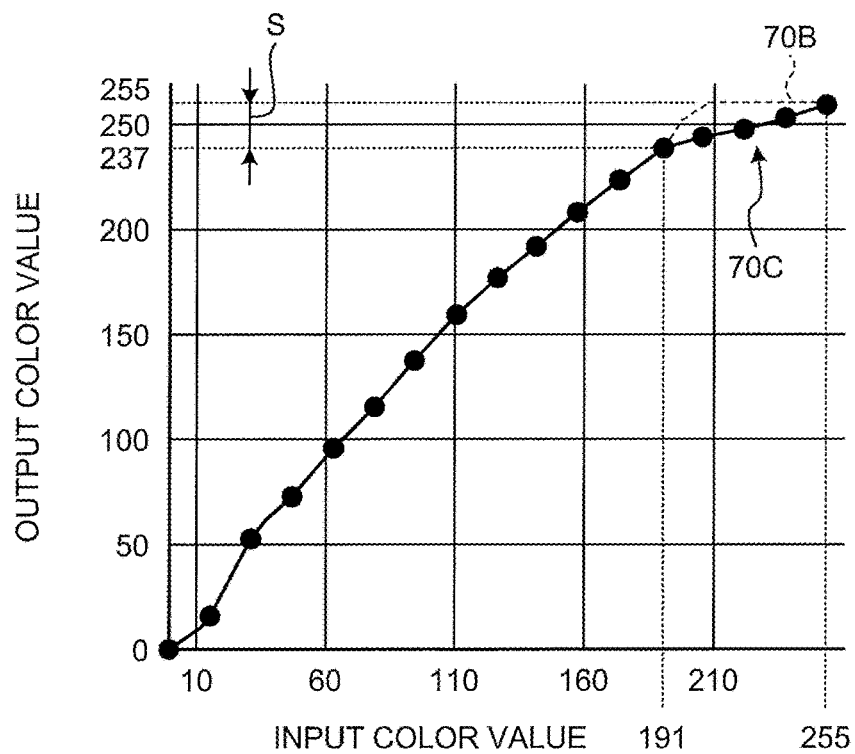
FIG. 26 is a schematic diagram illustrating an example of the correction table after rectification.

FIG. 26 is a schematic diagram illustrating an example of the correction table 70C after rectification. FIG. 27 is a diagram illustrating a relation among the correction table 70C after rectification, the correction table 70B, and a third colorimetric value described later. FIG. 26 and FIG. 27 illustrate a case in which the rectification color value is "237" by way of example. When the rectification part 61M rectifies the output color value in the rectification range S in the correction table 70B, the output color value in the rectification range S is rectified to be the output color value that monotonically increases from the input color value of "191" corresponding to the rectification color value of "237" toward the maximum color value of "255". Through this rectification processing, the correction table 70C after rectification is generated.

Returning to FIG. 17, the description will be continued. In the present embodiment, the rectification part 61M rectifies the correction table 70B by using the target characteristic 72 and the measured characteristic 74 used for generating the correction table 70B, and the rectification color value.

Specifically, the rectification part 61M includes a color value specification part 61N, a characteristic generation part 61P, and a color value rectification part 61Q.

The color value specification part 61N specifies the input color value corresponding to the output color value indicating the rectification color value in the correction table 70B. For example, the rectification color value is assumed to be "237". In this case, the color value specification part 61N specifies the input color value of "191" corresponding to the output color value of "237" from the correction table 70B illustrated in FIG. 23 and FIG. 24.

The color value specification part 61N may acquire the rectification color value by reading the rectification color value from the storage part 63 to be used for specifying the input color value.

The characteristic generation part 61P generates a rectification characteristic. The rectification characteristic is a characteristic obtained by rectifying part of the characteristic after γ conversion 75 (refer to FIG. 25), and indicates a relation between the color value and the colorimetric value (hereinafter, referred to as the third colorimetric value).

Figure 28:
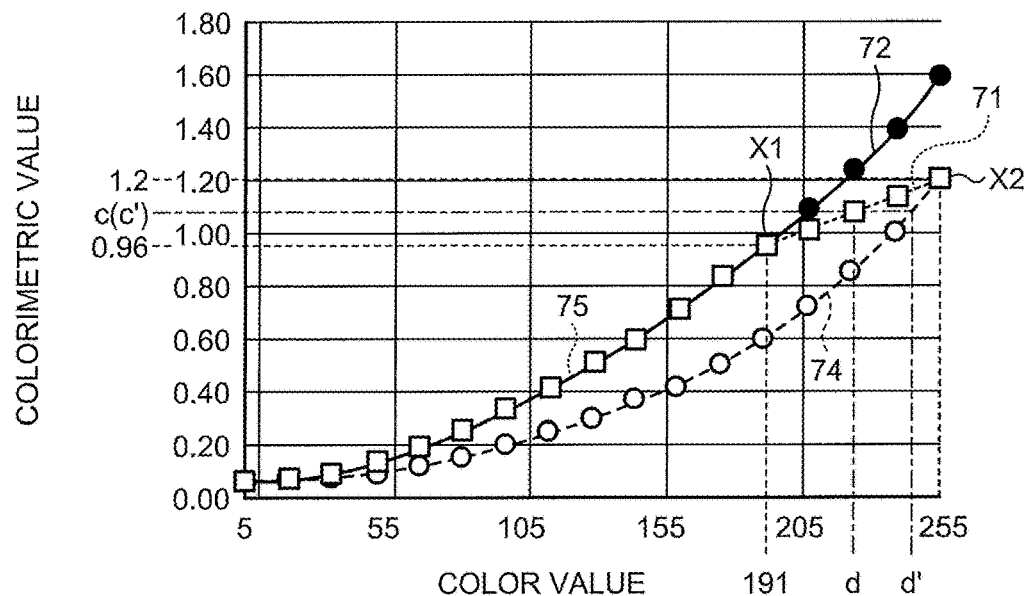
FIG. 28 is an explanatory diagram of an example of a rectification characteristic.

FIG. 28 is an explanatory diagram of an example of the rectification characteristic 71. FIG. 28 illustrates a case in which the rectification color value is "237" by way of example. The characteristic generation part 61P generates the rectification characteristic 71 using the target characteristic 72 and the measured characteristic 74 used for generating the correction table 70B, and the rectification color value.

First, the characteristic generation part 61P specifies the colorimetric value (for example, "0.96") at the time when an image of the rectification color value "237" is formed on the medium through the 1-path printing by the image forming device 12. The characteristic generation part 61P then specifies a first point X1 indicating the colorimetric value of "0.96" in the target characteristic 72. The characteristic generation part 61P also specifies a second point X2 indicating the maximum color value of "255" in the measured characteristic 74. The characteristic generation part 61P then interpolates between the first point X1 and the second point X2 to generate the rectification characteristic 71. Examples of interpolation include linear interpolation and spline interpolation. By way of example, the following describes a case of performing linear interpolation.

Thus, the rectification characteristic 71 is obtained by linearly interpolating a range from the colorimetric value after γ correction of "0.96" corresponding to the rectification color value of "237" to the second colorimetric value of "1.2" corresponding to the maximum color value of "255" in the characteristic after γ conversion 75 indicating a relation between the color value and the colorimetric value after γ correction using the correction table 70B.

In other words, the characteristic generation part 61P corrects a relation between the input color value and the colorimetric value after γ correction shown in a range V1 in which the output color value corresponds to the rectification color value of "237" to the maximum color value of "255" in the characteristic after γ conversion 75 illustrated in FIG. 24 to be a relation between the third colorimetric value in a range V2 and the input color value illustrated in FIG. 27. Due to this, the characteristic generation part 61P generates the rectification characteristic 71.

Returning to FIG. 17, the following describes the color value rectification part 61Q. The color value rectification part 61Q rectifies the output color value in the rectification range S in the correction table 70B to be a color value corresponding to the second colorimetric value indicating the third colorimetric value in the rectification characteristic 71 in the measured characteristic 74.

A description will be made with reference to FIG. 27 and FIG. 28. It is assumed that the rectification range S of the output color value in the correction table 70B is from the rectification color value of "237" to the maximum color value of "255" (refer to the region S1 in FIG. 27). In this case, the color value rectification part 61Q rectifies the output color value of "237" to the maximum color value of "255" in the correction table 70B to be a value shown in the region S2 of FIG. 27.

A specific description will be made with reference to FIG. 28. The color value rectification part 61Q specifies a color value d' in the measured characteristic 74 corresponding to a second colorimetric value c' that is the same value as a third colorimetric value c corresponding to a color value d in the rectification characteristic 71.

The color value rectification part 61Q performs the same processing as described above on each output color value in the rectification range S in the correction table 70B to specify a pair of the color value d in the rectification characteristic 71 and the color value d' in the measured characteristic 74. The color value rectification part 61Q rectifies the correction table 70B so that the color value d in the rectification characteristic 71 is set to be the input color value and the color value d' in the measured characteristic 74 is set to be the output color value in each pair, and generates the correction table 70C after rectification.

In this way, the rectification part 61M rectifies the output color value in the rectification range S from the rectification color value to the maximum color value in the correction table 70B generated by the generation part 60K to be the output color value that monotonically increases (refer to FIG. 26). Due to this, the rectification part 61M rectifies the correction table 70B to be the correction table 70C after rectification.

Returning to FIG. 17, the description will be continued. The update part 61L associates the correction table 70C after rectification rectified by the rectification part 61M with the calibration condition acquired by the acquisition part 60H and registers them in the correction management DB 62A (refer to FIG. 8). That is, the update part 61L performs processing similar to that performed by the update part 60L according to the first embodiment except that the update part 61L uses the correction table 70C after rectification obtained by rectifying the correction table 70B in place of the correction table 70B generated by the generation part 60K. Thus, in the present embodiment, the correction table 70C after rectification is registered in the correction management DB 62A of the storage part 63 in place of the correction table 70B.

Next, the following describes an example of an information processing procedure at the time when the correction table is updated performed by the control part 61 of the information processing device 11.

Figure 29:
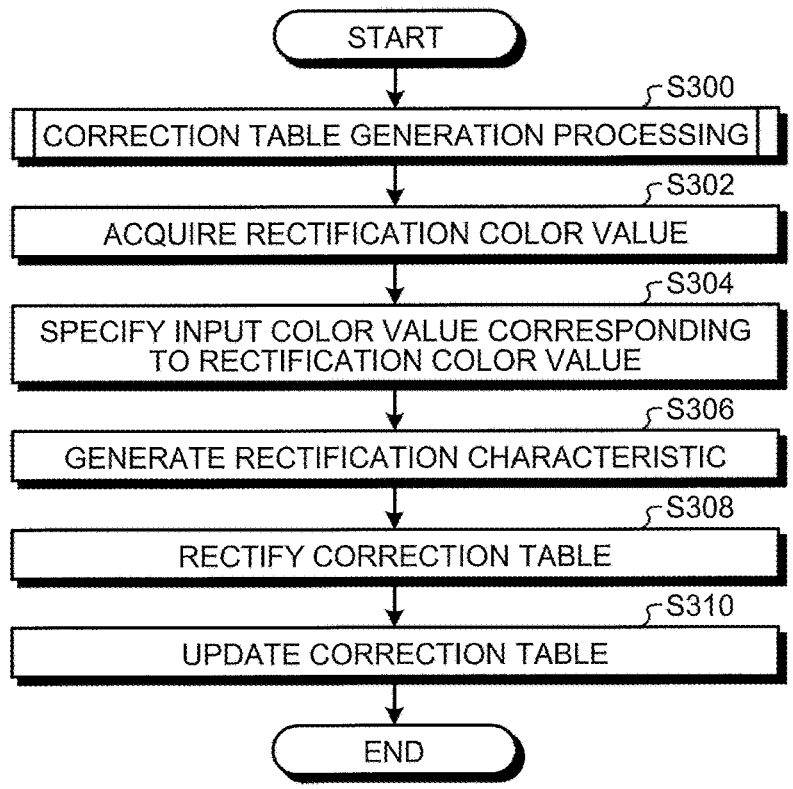
FIG. 29 is a flowchart illustrating an example of an information processing procedure at the time when the correction table is updated.

FIG. 29 is a flowchart illustrating an example of the information processing procedure at the time when the correction table is updated performed by the control part 61 of the information processing device 11.

First, the control part 61 performs correction table generation processing (Step S300). The processing at Step S300 is the same as Step S100 to Step S140 in FIG. 15 described in the first embodiment. Accordingly, the correction table 70B is generated through the processing at Step S300.

Next, the color value specification part 61N acquires the rectification color value (Step S302). In the present embodiment, the color value specification part 61N reads the rectification color value from the storage part 63 to acquire the rectification color value.

Next, the color value specification part 61N specifies the input color value corresponding to the output color value indicating the rectification color value acquired at Step S302 in the correction table 70B generated at Step S300 (Step S304).

Next, the characteristic generation part 61P generates the rectification characteristic 71 by using the target characteristic 72 and the measured characteristic 74 used for generating the correction table 70B generated at Step S300, and the rectification color value acquired at Step S302 (Step S306).

Next, the color value rectification part 61Q rectifies the correction table 70B generated at Step S300 (Step S308). The color value rectification part 61Q rectifies the output color value in the rectification range S from the rectification color value acquired at Step S302 to the maximum color value in the correction table 70B. At this point in time, the color value rectification part 61Q rectifies the output color value in the rectification range S to be the color value, in the measured characteristic 74 specified at Step S300, corresponding to the second colorimetric value indicating the third colorimetric value in the rectification characteristic 71 generated at Step S306.

Next, the update part 61L registers, in the correction management DB 62A, the correction table 70C after being rectified at Step S308 being associated with the calibration condition acquired at Step S300 (specifically, Step S100 in FIG. 15). Due to this, the update part 61L updates the correction table (Step S310). This routine is then ended.

As described above, in the present embodiment, the rectification part 61M rectifies the output color value in the rectification range S from the predetermined rectification color value to the maximum color value in the correction table 70B to be the output color value that monotonically increases.

Thus, the information processing device 11 according to the present embodiment can prevent the colorimetric value of the formed image from being saturated as the output color value comes closer to the maximum color value (for example, the gradation value of "255").

Accordingly, with the information processing device 11 according to the present embodiment, the image quality of the laminated image 50 of the special color image 52 and the colored image 54 can be further improved.

The rectification part 61M includes the color value specification part 61N, the characteristic generation part 61P, and the color value rectification part 61Q. The color value specification part 61N specifies the input color value corresponding to the output color value indicating the rectification color value in the correction table 70B. The characteristic generation part 61P interpolates between the first point indicating the colorimetric value at the time when the image of the rectification color value is formed on the medium through the 1-path printing by the image forming device 12 in the target characteristic 72 and the second point indicating the maximum color value in the measured characteristic 74 to generate the rectification characteristic 71 indicating a relation between the colorimetric value and the color value. The color value rectification part 61Q rectifies the output color value in the rectification range S in the correction table 70B to be the color value, in the measured characteristic 74, corresponding to the second colorimetric value indicating the colorimetric value in the rectification characteristic 71.

Third Embodiment

In the second embodiment described above, described is a form of storing the rectification color value of one value in the storage part 63 in advance. In the present embodiment, described is a form of rectifying the correction table 70B for each color using the rectification color value corresponding to a color of the color material used for image formation.

FIG. 17 is a block diagram illustrating a functional configuration of the information processing device 11A according to the present embodiment.

The information processing device 11A includes a control part 65, the UI part 64, and the storage part 63. The UI part 64 and the storage part 63 are connected to the control part 65 so as to exchange data or a signal with each other.

The UI part 64 is the same as that in the first embodiment. The storage part 63 is the same as that in the second embodiment except that the storage part 63 previously stores therein the color management table 63D (details will be described later) in place of the rectification color value 63C.

The control part 65 is the same as the control part 61 in the second embodiment except that the control part 65 includes an update processing part 65F in place of the update processing part 61F. The update processing part 65F is the same as the update processing part 61F in the second embodiment except that the update processing part 65F includes a rectification part 65M in place of the rectification part 61M.

The rectification part 65M rectifies the correction table 70B for each color of the color material using the rectification color value corresponding to the color of the color material used for image formation.

For example, the rectification part 65M acquires the rectification color value corresponding to each color (for example, C, M, Y, and K) of the colored color material used by the image forming device 12 for image formation.

In this case, the storage part 63 stores therein the color management table 63D in advance. FIG. 30 is a schematic diagram illustrating an example of a data configuration of the color management table 63D. The color management table 63D previously associates each color of C, M, Y, and K with the rectification color value corresponding to each color.

The rectification color value to be registered in the color management table 63D may be previously determined to be a value for preventing the colorimetric value from being saturated on a high color value side using a measurement result obtained by using the image forming device 12 and the colorimeter 14.

As illustrated in FIG. 30, the rectification color value is preferably smaller as brightness of an image as a formation target is lower. That is, it is preferable that a smaller rectification color value is previously associated with a color having lower brightness to be registered in the color management table 63D.

In the present embodiment, from a color having high brightness toward a color having low brightness (in order of Y, C and M, and K), rectification color values previously associated therewith to be registered in the color management table 63D becomes smaller.

The rectification part 65M reads, from the color management table 63D, the rectification color value corresponding to the color of the color material used for image formation. The rectification part 65M preferably rectifies the correction table 70B for each color using the rectification color value acquired for each color.

Specifically, the rectification part 65M according to the present embodiment includes a color value specification part 65N, a characteristic generation part 65P, and a color value rectification part 65Q.

The rectification part 65M performs the same processing as that performed by the color value specification part 61N in the second embodiment except that the rectification part 65M uses the rectification color value corresponding to the color of C, M, Y, and K. That is, for each color of the color material used for image formation, the rectification part 65M specifies the input color value corresponding to the output color value indicating the rectification color value of the color from the correction table 70B corresponding to the color.

For example, the rectification part 65M acquires the rectification color value of "159" corresponding to K color from the color management table 63D. The rectification part 65M then specifies the input color value corresponding to the output color value of "159" from the correction table 70B generated for K color. The rectification part 65M also specifies the input color value for each color of C, M, and Y in the same manner.

The characteristic generation part 65P specifies the rectification characteristic 71. In the present embodiment, the characteristic generation part 65P performs the same processing as that performed by the characteristic generation part 61P in the second embodiment except that the characteristic generation part 65P specifies the rectification characteristic 71 for each color of C, M, Y, and K.

That is, for each color of C, M, Y, and K, the characteristic generation part 65P generates the rectification characteristic 71 for each color using the target characteristic 72 and the measured characteristic 74 used for generating the correction table 70B for each color and the rectification color value ("207", "207", "223", and "159") of each color.

The color value rectification part 65Q performs the same processing as that performed by the color value rectification part 61Q according to the second embodiment except that the color value rectification part 65Q rectifies, for each color of C, M, Y, and K, the correction table 70B corresponding to each color using the rectification color value corresponding to each color.

That is, the color value rectification part 65Q rectifies the output color value in the rectification range S in the correction table 70B corresponding to each color of C, M, Y, and K to be the color value, in the measured characteristic 74 corresponding to each color, corresponding to the second colorimetric value indicating the third colorimetric value of the rectification characteristic 71 corresponding to each color.

In this way, the rectification part 65M rectifies the correction table 70B corresponding to each color to be the correction table 70C after rectification using the rectification color value corresponding to each color.

Thus, the γ correction part 60B can perform γ correction on the colored image data 20 (color image data 20C, 20M, 20Y, and 20K) of each color of C, M, Y, and K using the correction table 70C after rectification corresponding to each color.

In a case of using the rectification color value of one value without using the rectification color value corresponding to each color of C, M, Y, and K, in some cases, saturation of the colorimetric value after γ correction is not improved for the laminated image 50 formed through the 1-path printing using the colored image data 20 that is γ-corrected by using the correction table 70C after rectification. This is because, in a case of using the rectification color value of one value irrespective of the color, the rectification characteristic 71 indicating a characteristic in which a measurement value is slightly changed even when the color value is changed may be generated.

FIGS. 31A and 31B are schematic diagrams illustrating an example of the rectification characteristic 71. FIG. 31A is a schematic diagram illustrating the target characteristic 72, the measured characteristic 74, and the rectification characteristic 71 corresponding to Y color. FIG. 31B is a schematic diagram illustrating the target characteristic 72, the measured characteristic 74, and the rectification characteristic 71 corresponding to K color. FIG. 31A and FIG. 31B are diagrams illustrating cases of generating the rectification characteristic 71 using the same rectification color value of "223".

As illustrated in FIG. 31A, in a case of using the same rectification color value for each color, the rectification characteristic 71 corresponding to Y color having higher brightness indicates a relation in which the colorimetric value monotonically increases in accordance with a change of the color value. On the other hand, as illustrated in FIG. 31B, the rectification characteristic 71 corresponding to K color having lower brightness may indicate a relation in which the calorimetric value is substantially constant irrespective of the change of the color value in a case of using the same rectification color value as that of Y color. In this way, in a case of using the same rectification color value for each color, even when the calorimetric value of a certain color is prevented from being saturated, the colorimetric value of another color is not prevented from being saturated in some cases.

Thus, when the correction table 70B is rectified using the rectification characteristic 71 illustrated in FIG. 31B for K color, the colorimetric value of the formed image cannot be prevented from being saturated in the vicinity of the maximum color value in some cases.

Thus, in the present embodiment, as described above, the color value rectification part 65Q rectifies, for each color of C, M, Y, and K, the correction table 70B corresponding to each color using the rectification color value corresponding to each color. Thus, the rectification characteristic 71 generated by using the rectification color value corresponding to K color is, for example, a rectification characteristic illustrated in FIG. 32. FIG. 32 is an explanatory diagram of the rectification characteristic 71 generated by using the rectification color value corresponding to K color.

As illustrated in FIG. 32, the rectification characteristic 71 generated by using the rectification color value corresponding to K color indicates a relation in which the colorimetric value monotonically increases in accordance with a change of the color value as compared with the rectification characteristic 71 generated by using the same rectification color value as that of Y color (refer to FIG. 31B).

Due to this, by generating the rectification characteristic 71 for each color using the rectification color value corresponding to each color, and rectifying the correction table 70B for each color using the rectification characteristic 71, the image quality can be further improved.

As described above, the rectification part 65M of the information processing device 11A according to the present embodiment rectifies the correction table 70B for each color of the color material using the rectification color value corresponding to the color of the color material used for image formation.

Accordingly, with the information processing device 11A according to the present embodiment, the image quality of the laminated image 50 of the special color image 52 and the colored image 54 can be further improved.

Fourth Embodiment

In the second embodiment, described is a form in which the rectification color value of one value is stored in the storage part 63 in advance. In the present embodiment, described is a form of rectifying the correction table 70B by using the rectification color value corresponding to the medium 40 as an image formation target.

FIG. 17 is a block diagram illustrating a functional configuration of an information processing device 11B according to the present embodiment.

The information processing device 11B includes a control part 66, the UI part 64, and the storage part 63. The UI part 64 and the storage part 63 are connected to the control part 66 so as to exchange data or a signal with each other.

The UI part 64 is the same as that in the first embodiment. The storage part 63 is the same as that in the second embodiment except that the storage part 63 previously stores therein a medium management table 63E (details will be described later) in place of the rectification color value 63C.

The control part 66 is the same as the control part 61 according to the second embodiment except that the control part 66 includes an update processing part 66F in place of the update processing part 61F. The update processing part 66F is the same as the update processing part 61F in the second embodiment except that the update processing part 66F includes a rectification part 66M in place of the rectification part 61M.

The rectification part 66M rectifies the correction table 70B using the rectification color value corresponding to the medium 40 as an image formation target.

In this case, the storage part 63 stores therein the medium management table 63E in advance. FIG. 33 is a schematic diagram illustrating an example of a data configuration of the medium management table 63E. The medium management table 63E associates the medium ID of the medium 40 with the rectification color value. The medium ID is the same as that in the first embodiment.

The rectification color value to be registered in the medium management table 63E may be previously determined to be a value for preventing the colorimetric value from being saturated on a high color value side with a measurement result for each medium 40 identified with the medium ID using the image forming device 12 and the colorimeter 14.

The rectification part 66M acquires the medium ID of the medium 40 as an image formation target from the image forming device 12 via the acquisition part 60H. The rectification part 66M may acquire the rectification color value corresponding to the medium 40 by reading the rectification color value corresponding to the acquired medium ID from the medium management table 63E.

The rectification part 66M may rectify the correction table 70B using the acquired rectification color value. Rectification of the correction table 70B performed by the rectification part 66M is the same as that in the second embodiment except that the rectification color value corresponding to the medium 40 as an image formation target is used.

Specifically, the rectification part 66M according to the present embodiment includes a color value specification part 66N, a characteristic generation part 66P, and a color value rectification part 66Q.

The color value specification part 66N, the characteristic generation part 66P, and the color value rectification part 66Q perform the same processing as that performed by the color value specification part 61N, the characteristic generation part 61P, and the color value rectification part 61Q in the second embodiment except that the rectification color value corresponding to the medium 40 is used.

When the rectification part 65M rectifies the correction table 70B using the rectification color value corresponding to the medium 40, the γ correction part 60B can perform γ correction using the rectified correction table 70C.

In a case of using the rectification color value of one value irrespective of the medium 40, there is a case in which saturation of the colorimetric value after γ correction is not improved for the laminated image 50 formed through the 1-path printing using the colored image data 20 that is γ-corrected by using the correction table 70C after rectification. This is because the rectification characteristic 71 indicating a characteristic in which a measurement value is slightly changed even when the color value is changed may be generated due to a color, a type, weighting, and the like of the medium 40.

Figure 34A:
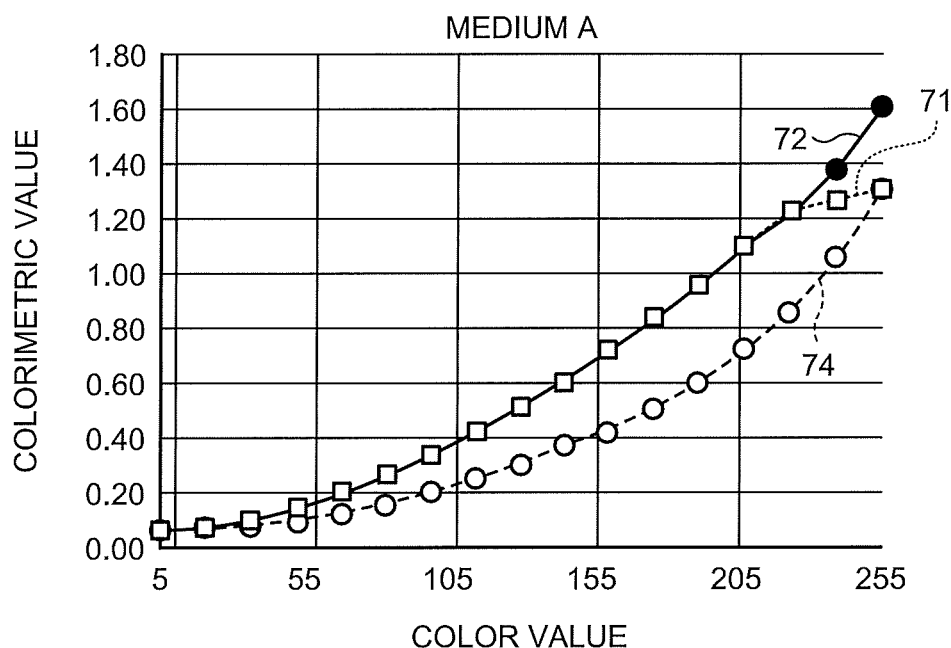
FIGS. 34A and 34B are schematic diagrams illustrating an example of the rectification characteristic.
Figure 34B:
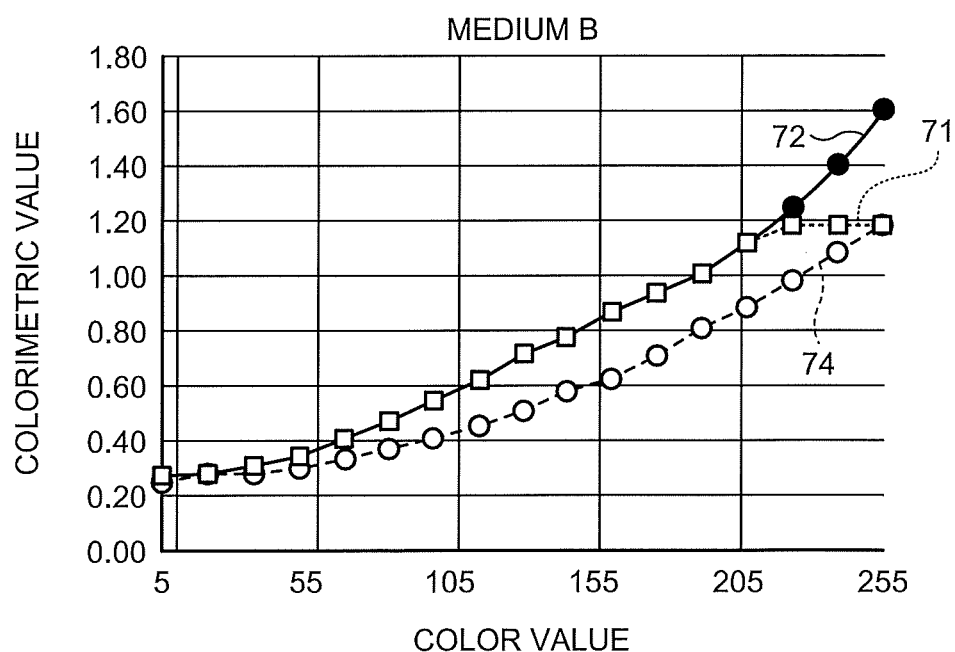

FIGS. 34A and 34M are schematic diagrams illustrating an example of the rectification characteristic 71. FIG. 34A is a schematic diagram illustrating the target characteristic 72, the measured characteristic 74, and the rectification characteristic 71 corresponding to the medium 40 of the medium ID "A". FIG. 34B is a schematic diagram illustrating the target characteristic 72, the measured characteristic 74, and the rectification characteristic 71 corresponding to the medium 40 of the medium ID "B". FIG. 34A and FIG. 34B are diagrams illustrating cases of generating the rectification characteristic 71 using the same rectification color value of "223".

As illustrated in FIG. 34A, in a case of using the same rectification color value irrespective of the medium 40, the rectification characteristic 71 corresponding to the medium 40 of the medium ID "A" indicates a relation in which the colorimetric value monotonically increases in accordance with a change of the color value. On the other hand, as illustrated in FIG. 34B, the rectification characteristic 71 of the medium ID "B" generated by using the same rectification color value as that of the medium ID "A" may indicate a relation in which the colorimetric value is substantially constant irrespective of a change of the color value. In this way, in a case of using the same rectification color value for each medium 40, even when the calorimetric value of a certain medium 40 is prevented from being saturated, the colorimetric value of another medium 40 is not prevented from being saturated in some cases.

Thus, depending on the type of the medium 40 and the like, when the correction table 70B is rectified by using the same rectification color value irrespective of the medium 40, the calorimetric value of the formed image cannot be prevented from being saturated in the vicinity of the maximum color value in some cases.

Thus, in the present embodiment, as described above, the color value rectification part 66Q rectifies the correction table 70B using the rectification color value corresponding to the medium 40 as an image formation target. Accordingly, for example, the rectification characteristic 71 generated by using the rectification color value of "191" corresponding to the medium ID "B" is a rectification characteristic illustrated in FIG. 35. FIG. 35 is an explanatory diagram of the rectification characteristic 71 generated by using the rectification color value corresponding to the medium ID "B" of the medium 40 as a formation target.

As illustrated in FIGS. 34A and 34B, the rectification characteristic 71 generated by using the rectification color value of "191" corresponding to the medium ID "B" indicates a relation in which the colorimetric value monotonically increases in accordance with a change of the color value as compared with the rectification characteristic 71 generated by using the same rectification color value of "223" as that of the medium ID "A" (refer to FIG. 34B).

Thus, by generating the rectification characteristic 71 using the rectification color value corresponding to the medium 40, and rectifying the correction table 70B using the rectification characteristic 71, the image quality can be further improved.

As described above, the rectification part 66M of the information processing device 11B according to the present embodiment rectifies the correction table 70B using the rectification color value corresponding to the medium 40 as an image formation target.

Accordingly, with the information processing device 11B according to the present embodiment, the image quality of the laminated image 50 of the special color image 52 and the colored image 54 can be further improved.

Fifth Embodiment

In the second embodiment, described is a form of previously storing the rectification color value of one value in the storage part 63. In the present embodiment, described is a form of rectifying the correction table 70B for each color in transfer order using the rectification color value corresponding to the transfer order of the color material used for image formation with respect to a transfer member (intermediate transfer belt 39).

FIG. 17 is a block diagram illustrating a functional configuration of an information processing device 11D according to the present embodiment.

The information processing device 11D includes a control part 68, the UI part 64, and the storage part 63. The UI part 64 and the storage part 63 are connected to the control part 68 so as to exchange data or a signal with each other.

The UI part 64 is the same as that in the first embodiment. The storage part 63 is the same as that in the second embodiment except that the storage part 63 previously stores therein a transfer order management table 63F (details will be described later) together with the rectification color value 63C.

The control part 68 is the same as the control part 61 in the second embodiment except that the control part 68 includes an update processing part 68F in place of the update processing part 61F. The update processing part 68F is the same as the update processing part 61F in the second embodiment except that the update processing part 68F includes a rectification part 68M in place of the rectification part 61M.

The rectification part 68M rectifies the correction table 70B in the transfer order using the rectification color value corresponding to the transfer order of primary transfer onto the intermediate transfer belt 39. Specifically, for each color of the color material transferred onto the intermediate transfer belt 39 in the image forming device 12, the rectification part 68M rectifies the correction table 70B using a rectification value corresponding to the transfer order of the color material of the color.

In the present embodiment, the rectification part 68M rectifies the correction table 70B in the transfer order onto the intermediate transfer belt 39 using the rectification color value smaller than a reference value as the transfer order is earlier. "The transfer order onto the intermediate transfer belt 39 is earlier" means that the color material is positioned closer to the intermediate transfer belt 39 when being primarily transferred.

For example, the rectification part 68M acquires, from the image forming device 12, the transfer order of each color of the colored color material used by the image forming device 12 for image formation. The rectification part 68M acquires the transfer order of each color from the image forming device 12 via the acquisition part 60H.

The rectification part 68M acquires the rectification color value corresponding to the transfer order.

For example, the storage part 63 previously stores therein the rectification color value 63C of one value and the transfer order management table 63F. The rectification color value 63C of one value is an example of a reference value.

FIG. 36 is a schematic diagram illustrating an example of a data configuration of the transfer order management table 63F. The transfer order management table 63F previously associates the transfer order with a correction amount of the reference value. The correction amount for correcting the reference value to be a smaller value as the transfer order is earlier (a value thereof is smaller) is previously registered in the transfer order management table 63F.

The rectification part 68M reads, from the transfer order management table 63F, the correction amount corresponding to the transfer order of each color (C, M, Y, and K) used for image formation. The rectification part 68M corrects the rectification color value 63C as the reference value with the read correction amount. Due to this, the rectification part 68M calculates, for each color primarily transferred in the transfer order, the rectification color value smaller than the reference value as the transfer order onto the intermediate transfer belt 39 is earlier. Accordingly, the rectification part 68M acquires the rectification color value in the transfer order of the color of the color material used for image formation.

FIG. 37 is a diagram illustrating an example of the rectification color value corresponding to the transfer order of the color of the color material used for image formation. As illustrated in FIG. 37, the rectification part 68M acquires, for each color, a smaller rectification color value as the transfer order of primary transfer onto the intermediate transfer belt 39 is earlier.

The rectification part 68M then rectifies the correction table 70B in the transfer order (that is, for each color) using the rectification color value acquired in the transfer order of the color of the color material used for image formation.

Specifically, the rectification part 68M according to the present embodiment includes a color value specification part 68N, a characteristic generation part 68P, and a color value rectification part 68Q.

The rectification part 68M performs the same processing as that performed by the color value specification part 61N in the second embodiment except that the rectification part 68M uses the rectification color value corresponding to the transfer order of each color of C, M, Y, and K. That is, the rectification part 68M specifies, in the transfer order of each color of the color material used for image formation, the input color value corresponding to the output color value indicating the rectification color value of the transfer order from the correction table 70B corresponding to the color.

The characteristic generation part 68P specifies the rectification characteristic 71. In the present embodiment, the characteristic generation part 68P performs the same processing as that performed by the characteristic generation part 61P in the second embodiment except that the characteristic generation part 68P generates the rectification characteristic 71 in the transfer order of the color of C, M, Y, and K.

The color value rectification part 68Q performs the same processing as that performed by the color value rectification part 61Q in the second embodiment except that the color value rectification part 68Q rectifies, in the transfer order of each color of C, M, Y, and K, the correction table 70B corresponding to each color using the rectification color value corresponding to the transfer order.

In this way, the rectification part 68M rectifies the correction table 70B corresponding to each color to be the correction table 70C after rectification using the rectification color value corresponding to the transfer order of each color.

Thus, the γ correction part 60B can perform γ correction on the colored image data 20 of each color of C, M, Y, and K (color image data 20C, 20M, 20Y, and 20K) using the correction table 70C after rectification corresponding to the transfer order of primary transfer of the color material of each color onto the intermediate transfer belt 39.

In a case of using the rectification color value of one value (for example, the reference value) without using the rectification color value corresponding to the transfer order of each color of C, M, Y, and K, in some cases, saturation of the colorimetric value after γ correction is not improved for the laminated image 50 formed through the 1-path printing using the colored image data 20 that is γ-corrected by using the correction table 70C after rectification. This is because, when the rectification color value of one value is used irrespective of the transfer order, the rectification characteristic 71 indicating a characteristic in which a measurement value is slightly changed even when the color value is changed may be generated.

Figure 38A:
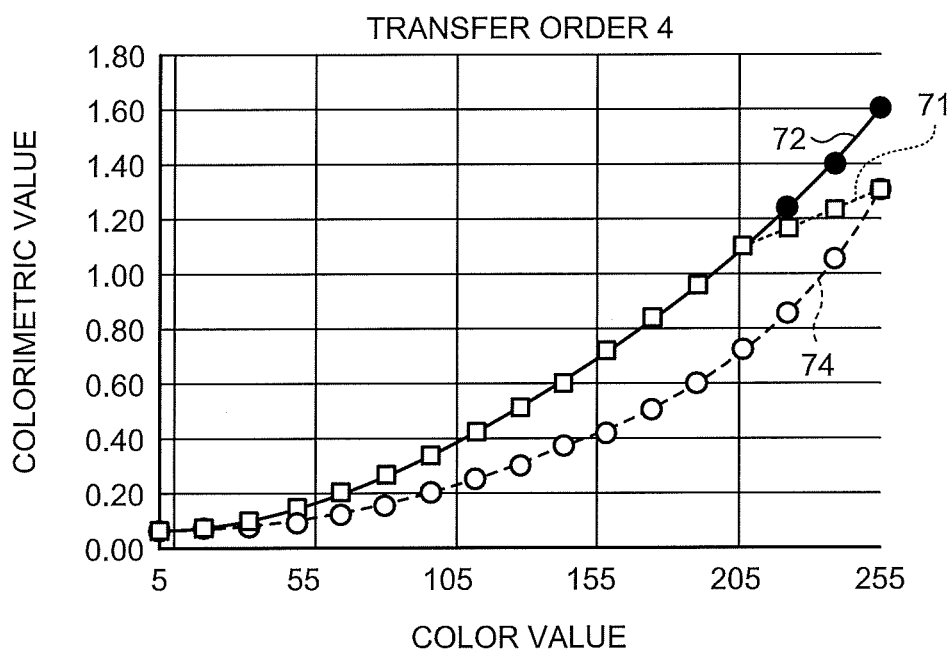
FIGS. 38A and 38B are schematic diagrams illustrating an example of the rectification characteristic.
Figure 38B:
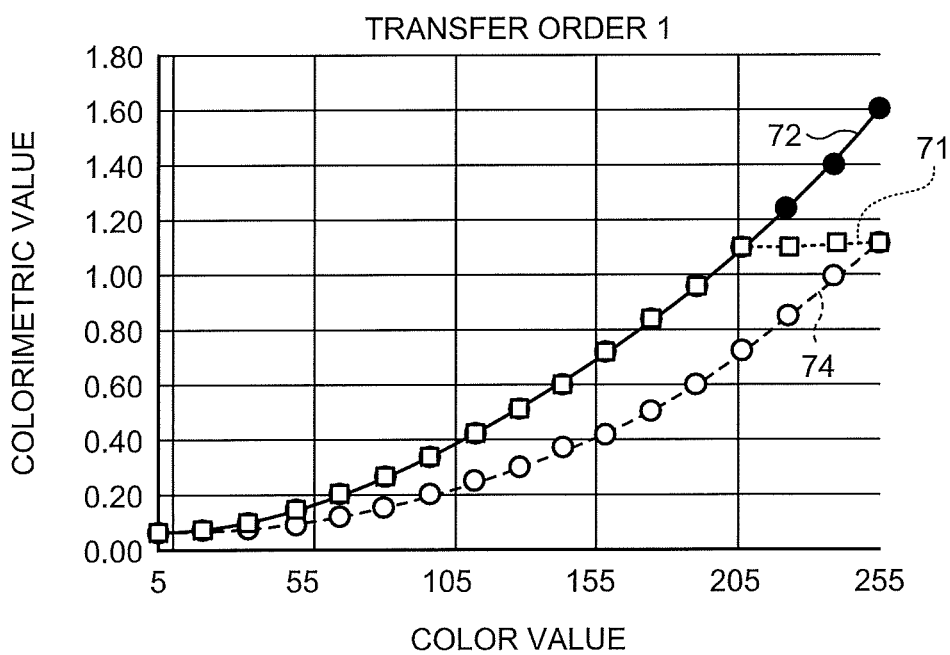

FIGS. 38A and 38B are schematic diagrams illustrating an example of the rectification characteristic 71. FIG. 38A is a schematic diagram illustrating the target characteristic 72, the measured characteristic 74, and the rectification characteristic 71 corresponding to a color that is primarily transferred in the transfer order of "4". FIG. 38B is a schematic diagram illustrating the target characteristic 72, the measured characteristic 74, and the rectification characteristic 71 corresponding to the color that is primarily transferred in the transfer order of "1". FIG. 38A and FIG. 38B are diagrams illustrating cases of generating the rectification characteristic 71 using the same rectification color value of "207". FIG. 38A and FIG. 38B are diagrams illustrating cases of using the color material of the same color.

As illustrated in FIG. 38A, in a case of using the same rectification color value for the same color irrespective of the transfer order, the rectification characteristic 71 in a case of the latest transfer order of "4" indicates a relation in which the colorimetric value monotonically increases in accordance with a change of the color value. On the other hand, as illustrated in FIG. 38B, the rectification characteristic 71 in a case of the earliest transfer order of "1" may indicate a relation in which the colorimetric value is substantially constant irrespective of a change of the color value. It can be considered that transfer performance onto the intermediate transfer belt 39 may be deteriorated as the transfer order of primary transfer is earlier. Thus, it can be considered that the amount of the color material that is secondarily transferred onto the medium 40 is reduced as the transfer order of primary transfer is earlier, and the above-stated result may be obtained.

Thus, in a case of using the same rectification color value irrespective of the transfer order, when the correction table 70B is rectified by using the rectification characteristic 71 illustrated in FIG. 38B for a color transferred in the earliest transfer order of "1", the colorimetric value of the formed image cannot be prevented from being saturated in the vicinity of the maximum color value in some cases.

Figure 39:
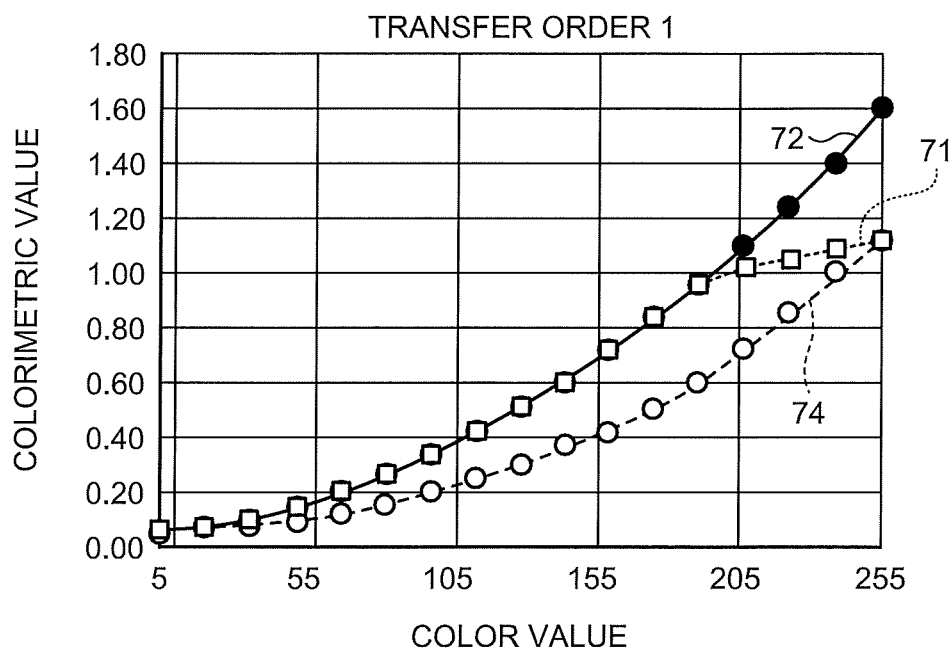
FIG. 39 is an explanatory diagram of an example of the rectification characteristic.

In the present embodiment, as described above, the color value rectification part 68Q rectifies the correction table 70B corresponding to each color using the rectification color value corresponding to the transfer order in the transfer order of primary transfer onto the intermediate transfer belt 39 of colors of C, M, Y, and K. Thus, the rectification characteristic 71 generated by using the rectification color value corresponding to the earliest transfer order of "1" is, for example, a rectification characteristic illustrated in FIG. 39. FIG. 39 is an explanatory diagram of the rectification characteristic 71 generated by using the rectification color value corresponding to the transfer order of "1".

As illustrated in FIG. 39, the rectification characteristic 71 generated by using the rectification color value corresponding to the transfer order of "1" indicates a relation in which the colorimetric value monotonically increases in accordance with a change of the color value as compared with the rectification characteristic 71 generated by using the same rectification color value as that of the transfer order of "4" (refer to FIG. 38B).

Thus, by generating the rectification characteristic 71 for each color in the transfer order using the rectification color value corresponding to the transfer order, and rectifying the correction table 70B for each color of the transfer order using the rectification characteristic 71, the image quality can be further improved.

As described above, the information processing device 11D according to the present embodiment controls the image forming device 12 (image forming part) that laminates a plurality of images to be primarily transferred onto the intermediate transfer belt 39 (transfer member) and secondarily transfers the laminate of the images onto the medium 40. The rectification part 68M of the information processing device 11D rectifies the correction table 70B for each color in the transfer order using the rectification color value that is smaller than the reference value as the transfer order onto the intermediate transfer belt 39 (transfer member) is earlier.

Accordingly, with the information processing device 11D according to the present embodiment, the image quality of the laminated image 50 of the special color image 52 and the colored image 54 can be further improved.

Sixth Embodiment

In the second embodiment described above, described is a form of rectifying the correction table 70B using the rectification color value of one value. In the present embodiment, described is a form of updating the rectification color value stored in the storage part 63, and rectifying the correction table 70B using the updated rectification color value.

FIG. 17 is a block diagram illustrating a functional configuration of an information processing device 11E according to the present embodiment.

The information processing device 11E includes a control part 69, the UI part 64, and the storage part 63. The UI part 64 and the storage part 63 are connected to the control part 69 so as to exchange data or a signal with each other.

The UI part 64 is the same as that in the first embodiment. The storage part 63 is the same as the storage part 62 in the first embodiment. That is, the rectification color value of one value is previously stored in the storage part 63.

The control part 69 is the same as the control part 61 in the second embodiment except that the control part 69 includes an update processing part 69F in place of the update processing part 61F. The update processing part 69F is the same as the update processing part 61F in the second embodiment except that the update processing part 69F includes a rectification part 69M in place of the rectification part 61M.

If a predetermined condition is satisfied, the rectification part 69M updates the rectification color value stored in the storage part 63, and rectifies the correction table 70B using the updated rectification color value.

The rectification part 69M according to the present embodiment includes a color value specification part 69N, a characteristic generation part 69P, and a color value rectification part 69Q. The color value specification part 69N, the characteristic generation part 69P, and the color value rectification part 69Q respectively perform the same processing as that performed by the color value specification part 61N, the characteristic generation part 61P, and the color value rectification part 61Q in the second embodiment described above except that the updated rectification color value is used.

Specifically, in the present embodiment, if the predetermined rectification color value is equal to or larger than the color value in the target characteristic 72 corresponding to the first colorimetric value indicating the second colorimetric value of the maximum color value in the measured characteristic 74, the rectification part 69M updates the rectification color value to be smaller than the color value. The rectification part 69M rectifies the correction table 70B using the updated rectification color value.

Figure 40:
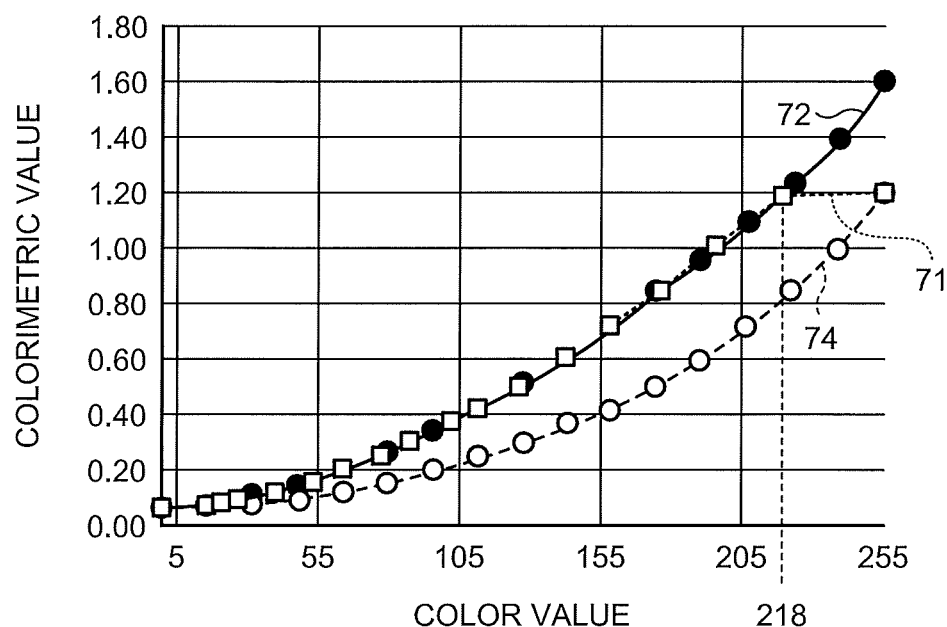
FIG. 40 is a schematic diagram illustrating an example of the rectification characteristic.

FIG. 40 is a schematic diagram illustrating an example of the rectification characteristic 71. FIG. 40 is a schematic diagram illustrating the target characteristic 72 and the measured characteristic 74 in a case in which the predetermined rectification color value is equal to or larger than "218".

The color value of "218" is the color value of "218" in the target characteristic 72 corresponding to the first calorimetric value indicating the second calorimetric value of "1.00" of the maximum color value of "255" in the measured characteristic 74 illustrated in FIG. 40.

In a case in which the rectification color value is equal to or larger than such a color value (in the example illustrated in FIG. 40, the color value of "218"), the calorimetric value may be substantially constant irrespective of a change of the color value. Thus, in this case, when the correction table 70B is rectified using the rectification color value, the colorimetric value of the formed image cannot be prevented from being saturated in the vicinity of the maximum color value in some cases.

Thus, the rectification color value is preferably smaller than the color value in the target characteristic 72 corresponding to the first colorimetric value indicating the second colorimetric value of the maximum color value in the measured characteristic 74.

Thus, in the present embodiment, if the predetermined rectification color value is equal to or larger than the color value in the target characteristic 72 corresponding to the first colorimetric value indicating the second colorimetric value of the maximum color value in the measured characteristic 74, the rectification part 69M updates the rectification color value to be smaller than the color value. The rectification part 69M rectifies the correction table 70B using the updated rectification color value.

The rectification color value is preferably a color value obtained by subtracting a difference between the maximum color value in the measured characteristic 74 and the color value from the color value in the target characteristic 72 corresponding to the first colorimetric value indicating the second calorimetric value of the maximum color value in the measured characteristic 74.

Thus, the rectification part 69M preferably rectifies the predetermined rectification color value to be a color value obtained by subtracting a difference between the maximum color value in the measured characteristic 74 and the color value from the color value in the target characteristic 72 corresponding to the first colorimetric value indicating the second colorimetric value of the maximum color value in the measured characteristic 74.

In a case of the example illustrated in FIG. 40, the rectification part 69M updates the rectification color value to be the color value of "181" obtained by subtracting the difference of "37" between the maximum color value of "255" in the measured characteristic 74 and the color value of "218" from the color value of "218". The rectification part 69M rectifies the correction table 70B using the updated color value.

Figure 41:
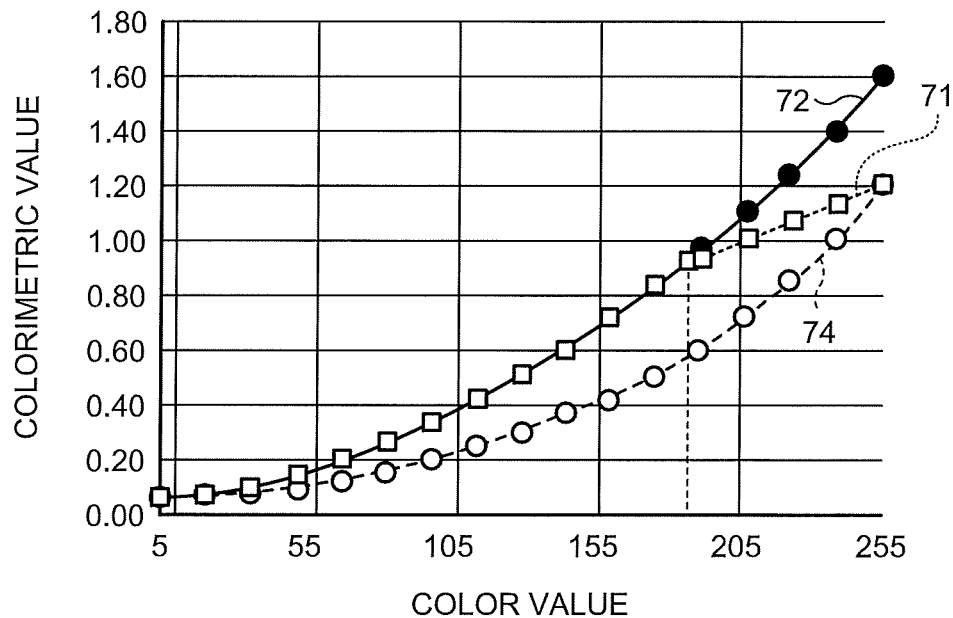
FIG. 41 is an explanatory diagram of an example of the rectification characteristic.

Thus, for example, the rectification characteristic 71 generated by using the updated rectification color value becomes a rectification characteristic illustrated in FIG. 41. FIG. 41 is an explanatory diagram of the rectification characteristic 71 generated by using the updated rectification color value.

As illustrated in FIG. 41, the rectification characteristic 71 generated by using the updated rectification color value of "181" indicates a relation in which the colorimetric value monotonically increases in accordance with a change of the color value as compared with the rectification characteristic 71 (refer to FIG. 40) generated by using the rectification color value before update (a value equal to or larger than "218").

Thus, by generating the rectification characteristic 71 using the updated rectification color value, and rectifying the correction table 70B using the rectification characteristic 71, the image quality can be further improved.

As described above, if the predetermined rectification color value is equal to or larger than the color value in the target characteristic 72 corresponding to the first colorimetric value indicating the second colorimetric value of the maximum color value in the measured characteristic 74, the rectification part 69M of the information processing device 11E according to the present embodiment updates the rectification color value to be smaller than the color value, and rectifies the correction table 70B using the updated rectification color value.

Accordingly, with the information processing device 11E according to the present embodiment, the image quality of the laminated image 50 of the special color image 52 and the colored image 54 can be further improved.

The rectification color value is preferably a color value obtained by subtracting a difference between the maximum color value in the measured characteristic 74 and the color value from the color value in the target characteristic 72 corresponding to the first colorimetric value indicating the second colorimetric value of the maximum color value in the measured characteristic 74.

The rectification color value is preferably smaller as a difference between the first colorimetric value corresponding to the maximum color value in the target characteristic 72 and the second colorimetric value corresponding to the maximum color value in the measured characteristic 74 is larger.

Second Modification

In the embodiment described above, described is a form in which the image forming device 12 and the information processing devices 10, 11, 11A, 11B, 11D, and 11E are separately configured. However, the image forming device 12 and the information processing devices 10, 11, 11A, 11B, 11C, 11D, or 11E may be integrally configured.

Figure 42:
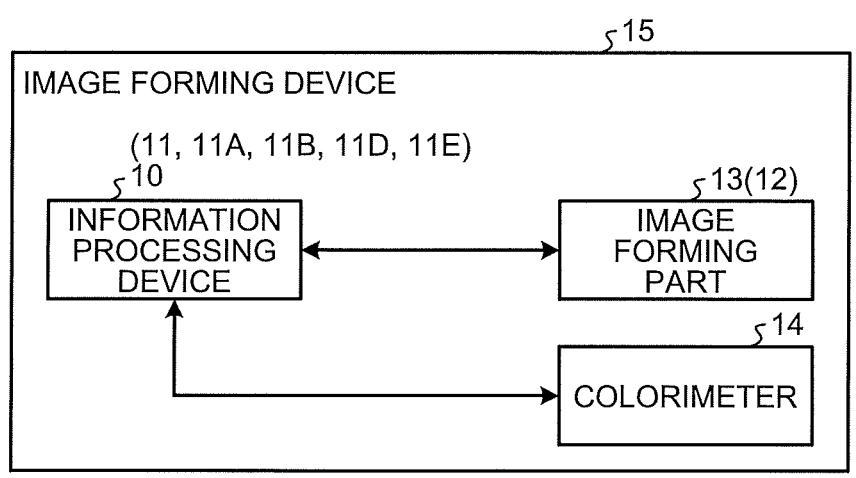
FIG. 42 is a schematic diagram illustrating an example of the image forming device.

FIG. 42 is a schematic diagram illustrating an example of an image forming device 15 according to the present modification. The image forming device 15 includes the information processing device 10, 11, 11A, 11B, 11C, 11D, or 11E, an image forming part 13, and the colorimeter 14. The information processing devices 10, 11, and 11A to 11E are the same as the information processing devices 10, 11, and 11A to 11E in the above embodiment. The image forming part 13 is the same as the image forming device 12 in the above embodiment. The colorimeter 14 is the same as the colorimeter 14 in the above embodiment. The information processing devices 10, 11, and 11A to 11E are connected to the image forming part 13 so as to exchange data or a signal with each other. The information processing devices 10, 11, and 11A to 11E are connected to the colorimeter 14 so as to exchange data or a signal with each other.

In this way, the image forming device 15 may include the information processing device 10, 11, 11A, 11B, 11C, 11D, or 11E, the image forming part 13 (image forming device 12), and the colorimeter 14.

In the above embodiment, described is a form in which the colorimeter 14 is connected to the information processing device 10, 11, 11A, 11B, 11C, 11D, or 11E by way of example. Alternatively, the colorimeter 14 and the image forming device 12 may be directly connected to each other.

The processing performed by the information processing devices 10, 11, 11A, 11B, 11C, 11D, and 11E in the above embodiments and the modifications is recorded and provided as a computer program product in a computer-readable recording medium such as a compact disc read only memory (CD-ROM), a flexible disk (FD), a compact disc recordable (CD-R), and a digital versatile disc (DVD), as an installable or executable file.

The computer program executed by the information processing devices 10, 11, 11A, 11B, 11D, and 11E in the above embodiments and the modifications may be stored in a computer connected to a network such as the Internet and provided by being downloaded via the network. Furthermore, the computer program executed by the information processing devices 10, 11, 11A, 11B, 11D, and 11E according to the above embodiments and the modifications may be provided or distributed via a network such as the Internet.

The computer program executed by the information processing devices 10, 11, 11A, 11B, 11D, and 11E according to the above embodiments and the modifications may be embedded and provided in a ROM, for example.

According to the embodiments, image quality of the laminated image of the colored image and the special color image can be improved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device configured to control an image forming part that forms a laminated image of a special color image using a special color material and a colored image using a colored color material through 2-path printing in which one of the special color image and the colored image is formed on a medium to be immobilized and the other one is laminated thereon, or 1-path printing in which one of the special color image and the colored image is formed on a medium and the other one is laminated thereon without performing immobilization, the information processing device comprising:
  a specification part configured to specify, by using image data for a correction chart defining a plurality of patch regions having different color values, a target characteristic indicating a relation between the color value and a first colorimetric value of a first patch image as the laminated image corresponding to each of the patch regions formed by the image forming part through the 2-path printing; and
  a generation part configured to generate a correction table for correcting the color value so that a measured characteristic comes close to the target characteristic, the measured characteristic indicating a relation between the color value and a second colorimetric value of a second patch image as the laminated image corresponding to each of the patch regions formed by the image forming part through the 1-path printing using the image data for a correction chart.

2. The information processing device according to claim 1, wherein
  the generation part generates the correction table in which the color value in the target characteristic is set to be an input color value and the color value in the measured characteristic corresponding to the second colorimetric value indicating the first colorimetric value in the target characteristic is set to be an output color value.

3. The information processing device according to claim 1, further comprising:
  an acquisition part configured to acquire special color type information indicating a type of the special color material used for image formation; and
  a determination part configured to determine the image data for a correction chart corresponding to the special color type information, wherein
  the specification part determines the target characteristic using the determined image data for a correction chart, and
  the generation part generates the correction table using the determined image data for a correction chart.

4. The information processing device according to claim 3, wherein
  the determination part determines the image data for a correction chart defining the patch region in which the special color region and the colored region are laminated with the color value including a special color value and a colored color value, the image data for a correction chart including image data for a special color correction chart defining the special color value of the special color region using the special color material of the type indicated by the special color type information and image data for a colored correction chart defining the colored color value of the colored region using the colored color material.

5. The information processing device according to claim 3, wherein
  the image forming part is configured to be able to switch a laminating order of the colored image and the special color image with respect to a medium,
  the acquisition part acquires laminating order information indicating the laminating order from the image forming part,
  the specification part specifies, by using the determined image data for a correction chart, the target characteristic indicating a relation between the color value and the first colorimetric value of the first patch image that is formed on a medium through the 2-path printing by the image forming part in the laminating order indicated by the acquired laminating order information using the special color material of the type indicated by the acquired special color type information, and
  the generation part generates the correction table so that a measured characteristic is matched with the target characteristic using the determined image data for a correction chart, the measured characteristic indicating a relation between the color value and the second colorimetric value of the second patch image formed on a medium through the 1-path printing by the image forming part in the acquired laminating order with the special color material of the type indicated by the acquired special color type information.

6. The information processing device according to claim 1, further comprising:
  a correction part configured to correct a color value of image data as a formation target using the correction table; and
  a transmission part configured to transmit the corrected image data to the image forming part.

7. The information processing device according to claim 1, wherein
  the special color material is a color material indicating any of a metal color, white, a transparent color, and a fluorescent color.

8. The information processing device according to claim 1, further comprising:
  a rectification part configured to rectify an output color value in a rectification range from a predetermined rectification color value to a maximum color value in the correction table to be the output color value that monotonically increases.

9. The information processing device according to claim 8, wherein
  the rectification part comprises:
  a color value specification part configured to specify an input color value corresponding to the output color value indicating the rectification color value in the correction table;
  a characteristic generation part configured to interpolate between a first point indicating a colorimetric value at the time when an image of the rectification color value is formed on a medium through the 1-path printing by the image forming part in the target characteristic and a second point indicating a maximum color value in the measured characteristic to generate a rectification characteristic indicating a relation between the colorimetric value and the color value; and
  a color value rectification part configured to rectify the output color value in the rectification range in the correction table to be the color value corresponding to the second colorimetric value indicating the calorimetric value in the rectification characteristic in the measured characteristic.

10. The information processing device according to claim 8, wherein
  the rectification color value is smaller than the color value in the target characteristic corresponding to the first calorimetric value indicating the second colorimetric value of a maximum color value in the measured characteristic.

11. The information processing device according to claim 8, wherein
the rectification color value is a color value obtained by subtracting a difference between the color value and the maximum color value in the measured characteristic from the color value in the target characteristic corresponding to the first colorimetric value indicating the second colorimetric value of the maximum color value in the measured characteristic.

12. The information processing device according to claim 8, wherein
the rectification color value becomes smaller as a difference between the first colorimetric value corresponding to the maximum color value in the target characteristic and the second colorimetric value corresponding to the maximum color value in the measured characteristic becomes larger.

13. The information processing device according to claim 8, wherein
the rectification color value becomes smaller as brightness of an image as a formation target becomes lower.

14. The information processing device according to claim 8, wherein
the rectification part rectifies the correction table for each color of the color material using the rectification color value corresponding to the color of the color material used for image formation.

15. The information processing device according claim 8, wherein
the rectification part rectifies the correction table using the rectification color value corresponding to a medium as an image formation target.

16. The information processing device according to claim 8, wherein
the information processing device controls the image forming part that laminates a plurality of images to be primarily transferred onto a transfer member and secondarily transfers a laminate of the images onto a medium, and
the rectification part rectifies the correction table for each color in a transfer order onto the transfer member using the rectification color value that is smaller than a reference value as the transfer order is earlier.

17. The information processing device according to claim 8, wherein
when the predetermined rectification color value is equal to or larger than the color value in the target characteristic corresponding to the first colorimetric value indicating the second colorimetric value of the maximum color value in the measured characteristic, the rectification part updates the rectification color value to be smaller than the color value, and rectifies the correction table using the updated rectification color value.

18. An information processing method for controlling an image forming part that forms a laminated image of a special color image using a special color material and a colored image using a colored color material through 2-path printing in which one of the special color image and the colored image is formed on a medium to be immobilized and the other one is laminated thereon, or 1-path printing in which one of the special color image and the colored image is formed on a medium and the other one is laminated thereon without performing immobilization, the information processing method comprising:
specifying, by using image data for a correction chart defining a plurality of patch regions having different color values, a target characteristic indicating a relation between the color value and a first colorimetric value of a first patch image as the laminated image corresponding to each of the patch regions formed by the image forming part through the 2-path printing; and
generating a correction table for correcting the color value so that a measured characteristic comes close to the target characteristic, the measured characteristic indicating a relation between the color value and a second colorimetric value of a second patch image as the laminated image corresponding to each of the patch regions formed by the image forming part through the 1-path printing using the image data for a correction chart.

19. A non-transitory computer-readable recording medium that contains an information processing program to be executed by a computer that controls an image forming part that forms a laminated image of a special color image using a special color material and a colored image using a colored color material through 2-path printing in which one of the special color image and the colored image is formed on a medium to be immobilized and the other one is laminated thereon, or 1-path printing in which one of the special color image and the colored image is formed on a medium and the other one is laminated thereon without performing immobilization, the information processing program causing the computer to execute:
specifying, by using image data for a correction chart defining a plurality of patch regions having different color values, a target characteristic indicating a relation between the color value and a first colorimetric value of a first patch image as the laminated image corresponding to each of the patch regions formed by the image forming part through the 2-path printing; and
generating a correction table for correcting the color value so that a measured characteristic comes close to the target characteristic, the measured characteristic indicating a relation between the color value and a second colorimetric value of a second patch image as the laminated image corresponding to each of the patch regions formed by the image forming part through the 1-path printing using the image data for a correction chart.

* * * * *